(12) United States Patent
Matan et al.

(10) Patent No.: US 12,474,382 B2
(45) Date of Patent: Nov. 18, 2025

(54) SENSOR-BASED ENERGY MANAGEMENT ENCLOSURE AND DISTRIBUTED ENERGY RESOURCE MANAGEMENT BASED ON SENSOR DATA

(71) Applicant: Apparent Labs, LLC, Novato, CA (US)

(72) Inventors: Stefan Matan, Novato, CA (US); Fred C. Horton, Santa Rosa, CA (US)

(73) Assignee: Apparent Labs, LLC, Novato, CA (US)

( * ) Notice: Subject to any disclaimer, the term of this patent is extended or adjusted under 35 U.S.C. 154(b) by 430 days.

(21) Appl. No.: 17/414,264

(22) PCT Filed: Dec. 17, 2019

(86) PCT No.: PCT/US2019/066998
§ 371 (c)(1),
(2) Date: Jun. 15, 2021

(87) PCT Pub. No.: WO2020/131973
PCT Pub. Date: Jun. 25, 2020

(65) Prior Publication Data
US 2022/0043038 A1    Feb. 10, 2022

Related U.S. Application Data

(60) Provisional application No. 62/780,879, filed on Dec. 17, 2018.

(51) Int. Cl.
*G01R 19/25*    (2006.01)
*G01R 21/133*    (2006.01)
(Continued)

(52) U.S. Cl.
CPC ..... *G01R 19/2513* (2013.01); *G01R 21/1331* (2013.01); *H02J 3/16* (2013.01);
(Continued)

(58) Field of Classification Search
CPC ............ G01R 19/2513; G01R 21/1331; G01R 21/1271; H02J 3/16; H02J 13/00002;
(Continued)

(56) References Cited

U.S. PATENT DOCUMENTS 8,559,150 B2    10/2013    Veroni
8,610,438 B1    12/2013    Sykora et al.
(Continued)

FOREIGN PATENT DOCUMENTS

CN    107154623 A    9/2017
CN    106093570 B    10/2018
(Continued)

OTHER PUBLICATIONS

Donnal, J. S., & Leeb, S. B. (2015). Noncontact Power Meter. IEEE Sensors Journal, 15(2), 1161-1169. https://doi.org/10.1109/jsen.2014.2359619 (Year: 2015).*
(Continued)

*Primary Examiner* — Thomas C Lee
*Assistant Examiner* — Tyler Dean Hedrick
(74) *Attorney, Agent, or Firm* — Compass IP Law PC

(57) ABSTRACT

A power system of a consumer premises includes a circuit breaker to provide power to an electrical circuit and a current sensor mounted proximate a connection of the circuit breaker. The current sensor generates data that a controller uses to compute current draw for the circuit fed by the circuit breaker. Based on the current draw information, the controller can determine how much real and reactive power is being drawn by individual circuits. The controller can use that information to trigger a power converter to adjust operation to change the quadrant of operation of the current vector.

20 Claims, 17 Drawing Sheets

(51) Int. Cl.
*H02J 3/16* (2006.01)
*H02J 13/00* (2006.01)

(52) U.S. Cl.
CPC .. *H02J 13/00002* (2020.01); *H02J 13/00036* (2020.01); *H02J 2310/60* (2020.01)

(58) Field of Classification Search
CPC ............. H02J 13/00036; H02J 2310/60; H02J 2203/10; H02J 3/46; H02J 2310/14; H02J 13/00004; H02J 13/0005; H02J 13/00028; Y02B 70/30; Y02B 70/3225; Y04S 20/222; Y04S 20/221; Y04S 20/242; Y02E 40/30
See application file for complete search history.

(56) References Cited

U.S. PATENT DOCUMENTS

| | | | |
|---|---|---|---|
| 2011/0058391 A1* | 3/2011 | Ueno | H02M 7/003 363/13 |
| 2012/0068692 A1* | 3/2012 | Patel | G01R 15/207 324/202 |
| 2012/0327563 A1 | 12/2012 | Cook | |
| 2013/0108027 A1* | 5/2013 | Kioski | H04Q 1/03 379/27.05 |
| 2013/0258730 A1 | 10/2013 | Sato et al. | |
| 2016/0204606 A1* | 7/2016 | Matan | H02J 3/003 700/291 |
| 2016/0334471 A1* | 11/2016 | Parker | G01R 21/06 |
| 2018/0246150 A1 | 8/2018 | Cook et al. | |
| 2020/0020050 A1* | 1/2020 | Bazhinov | H02B 1/056 |

FOREIGN PATENT DOCUMENTS

| | | |
|---|---|---|
| JP | 2011021986 A | 2/2011 |
| JP | 2012019667 A | 1/2012 |
| JP | 5537302 B2 | 7/2014 |
| KR | 20070103854 A | 10/2007 |

OTHER PUBLICATIONS

International Search Report and Written Opinion for PCT Patent Application No. PCT/US19/66998, Mailed Apr. 22, 2020, 10 pages.
Extended European Search Report for Patent Application No. 19898988.1, Mailed Aug. 10, 2022, 8 pages.
Australian First Examination Report for Patent Application No. 2019401591, Mailed Mar. 28, 2024, 3 pages.
Chinese and English Translation of P.R. China State Intellectual Property Office First Office Action for Patent Application No. 201980085421.X, Mailed Apr. 17, 2024, 19 pages.
Donnal, John S., et al., "Noncontact Power Meter", IEEE Sensors Journal, vol. 15, No. 2, Feb. 2015, 9 pages.
Chinese and English Translation of P.R. China State Intellectual Property Office Second Office Action for Patent Application No. 201980085421.X, Mailed Dec. 2, 2024, 13 pages.
Korean Notice of Preliminary Rejection for Patent Application No. 10-2021-7022343, Mailed Jul. 1, 2024, 5 pages.
Chinese and English translation of Notice of Allowance for Chinese Patent Application No. 201980085421.X, Mailed Apr. 29, 2025, 7 pages.

* cited by examiner

ସENSOR-BASED ENERGY MANAGEMENT ENCLOSURE AND DISTRIBUTED ENERGY RESOURCE MANAGEMENT BASED ON SENSOR DATA

PRIORITY

This application is a U.S. National Phase application under 35 U.S.C. § 371 of International Application No. PCT/US19/66998 filed Dec. 17, 2019, which in turn is based on, and claims the benefit of priority of, U.S. Provisional Application No. 62/780,879, filed Dec. 17, 2018, the entire contents of which are incorporated herein by reference.

FIELD

Descriptions herein are generally directed to an electrical power grid, and more particular descriptions are directed to distributed management in a power grid.

BACKGROUND

There has been an increase of so-called "smart meter" products introduced to provide increased control over a consumer premises or customer location. The smart meters are intended to provide information about the use of power in the consumer premises. The traditional information flow for a consumer premises is to use power and receive a bill at the end of the month to indicate what power has been used. Smart meters propose to provide information with regular monitoring. However, a smart meter is still a grid meter, meaning that the control still comes from in front of the meter, from the perspective of the grid or grid management, such as a utility. Any information gathered by the smart meters result in control by the grid, which ends up trying to control the consumer premises based on how the utility sees the power consumption from the grid at the point of entry into the consumer premises. Even when the energy production capability of a consumer premises are taken into account by the smart meter, the smart meter still measures and makes all determinations of how to control power consumption or power production is based on the viewpoint of the grid side of the power of common coupling (PCC).

The consumer premises may or may not include a solar installation or other local power production. Traditional solar tries to satisfy the customer's needs but can do so at the expense of the stability of the electrical grid. Traditional solar provides only real power. Attempts to provide reactive power with solar typically result in inefficient power usage, by changing the reactive power loading of the consumer premises. Whether changing the reactive loading to be more inductive or more capacitive, the net result in either case is that the consumer premises increases reactive power consumption to improve real power transfer. Net metering provides a financial incentive to a customer for excess power created locally, referring to power not used by the customer. However, net metering puts customers at odds with the utility or the service provider, seeing that a utility may be required to pay a customer or prosumer for power that is either not needed, or is the wrong type of power which can disrupt the grid stability.

Additionally, the desire for customers to reduce reliance on the grid operator incentives more solar deployment. However, installing more solar on a grid network can increase grid instability due to excess real power creation. In addition to the excess real power creation, the grid is also required to increase reactive power production to provide grid support to stabilize the grid. Reactive power production from a central grid location results in increased inefficiencies on the grid to push reactive power support miles down the power lines. Penetration of solar deployment beyond a certain level can result in "solar saturation", where the amount of solar resources on the grid can generate excess real power beyond the ability of the utility operator to effectively deal with the excess solar power or provide adequate reactive power support.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
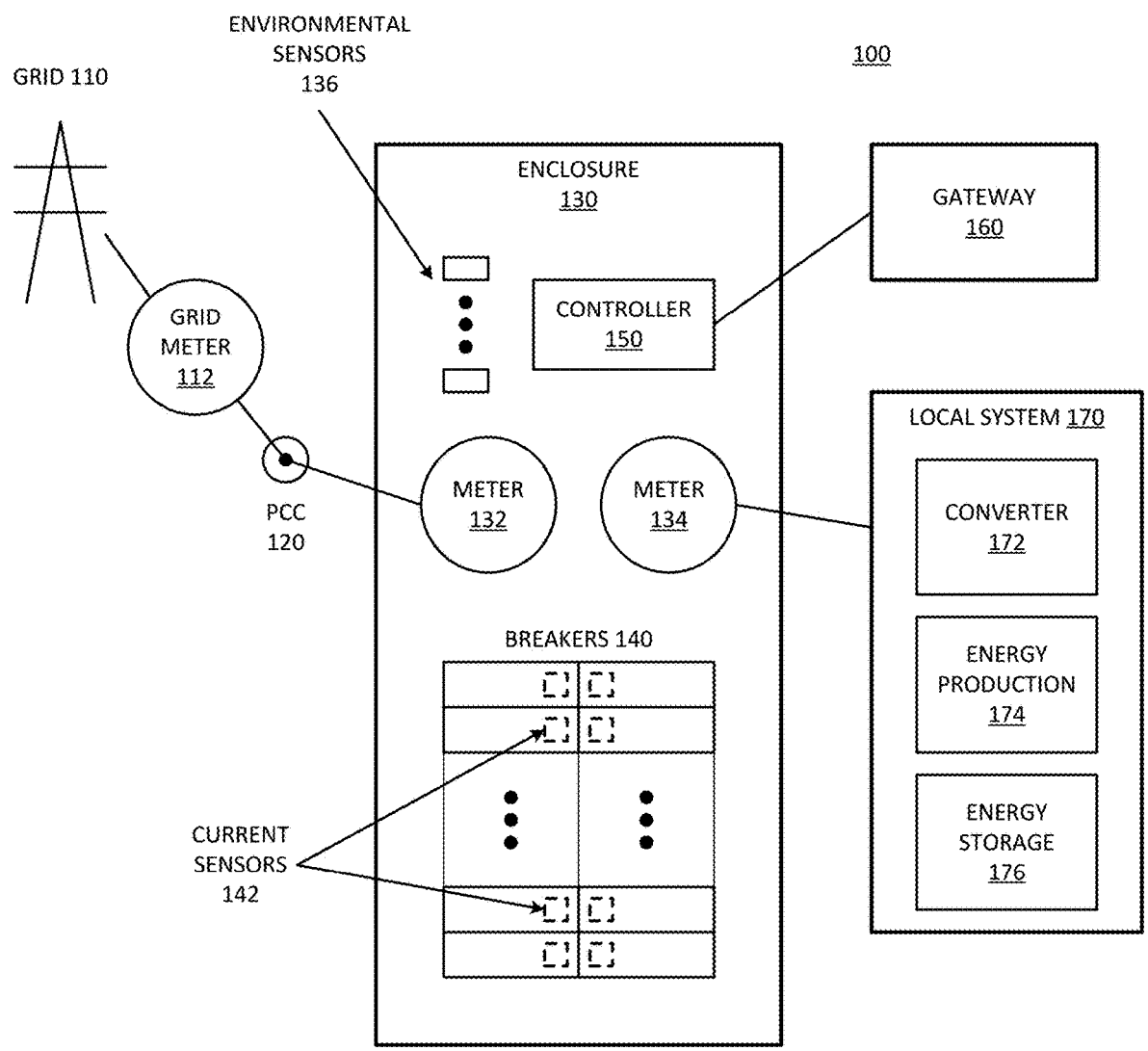
FIG. 1 is a block diagram of an example of a breaker box or enclosure for an intelligent grid operating system.

Descriptions of certain details and implementations follow, including non-limiting descriptions of the figures, which may depict some or all examples, and well as other potential implementations.

DETAILED DESCRIPTION

As provided herein, a system provides behind the meter control of the local power production. The behind the meter control can be based on local sensors within a breaker box enclosure. The breaker box can include sensors as well as control or intelligence to change internal operation of the system. The internal control allows the system to change a mix of real and reactive power by VAR injection rather than increasing or changing the reactive power impedance or changing the reactive power loading.

In one example, a power system located at a consumer premises includes a circuit breaker to provide power to an electrical circuit and a current sensor mounted proximate a connection of the circuit breaker. The system can be or include an enclosure. In one example, the system includes a gateway system that manages power flow and power use at the consumer premises. The current sensor generates data that a controller uses to compute current draw for the circuit fed by the circuit breaker. The controller can be a controller for the gateway, and can be located within the enclosure that includes the circuit breakers, or external to the enclosure and communicatively coupled to it. Based on the current draw information, the controller can determine how much real and reactive power is being drawn by individual circuits as controlled by different circuit breakers, with sensors at each circuit breaker. The controller can use that information to trigger a power converter to adjust operation to change the quadrant of operation of the current vector.

Even without local power production, the system can convert real power into reactive power for reactive power injection inside the meter. Thus, the system can appear to the grid to be drawing only real power, while providing reactive power internally within the system. Such operations can be made in response to the local sensor monitoring and internal metering.

In one example, a power system includes a first sensor to monitor current looking out to the point of common coupling (PCC) to connect to a power grid and a second sensor to monitor current looking into the local system, which can include a combination of loads, storage, and generation. Not all systems will include storage. Not all systems will include generation. Whether including storage or generation, or both, or neither, the system can adjust the operation of the power system to operate at a desired current vector. The first sensor can monitor a first current waveform of a connection to the PCC and the second sensor can monitor a second current waveform of a connection to the local system. The power system includes a controller to compute a quadrant of operation of the second current waveform, referring to the current waveform of the local system, as seen looking into the local system. The controller can compute a desired quadrant of operation of the second current waveform based on a quadrant of operation of the first current waveform.

The desired quadrant of operation refers to a current on a four-quadrant unit circle, and can be set to align at a desired offset with respect to the first current waveform. Thus, the system can set how the current of the local system operates in relation to the grid current. Rather than simply trying to match phase of the current with the grid to control power factor, the system can compute a current vector for the grid and a current vector for the local system, and perform vector calculations to determine how to adjust the local current to have a favorable operation with respect to the current.

FIG. 1 is a block diagram of an example of a breaker box or enclosure for an intelligent grid operating system. System 100 represents a power system for a consumer premises. In one example, system 100 includes enclosure 130, which represents an enclosure that includes circuit breaker for the electrical circuits of the consumer premises. The circuit breakers are represented as breakers 140.

Grid 110 represents a power grid, which is controlled by a utility. Grid 110 can be include any typical grid infrastructure, which generally includes at least one centralized grid operations management or grid control, and at least one centralized power generator. Traditional grid infrastructure generates the majority of power at a central generator and transmits electricity over power lines to consumers through substations. Distributed energy resources can also be operated by the utility to place energy production physically closer to energy consumers. PCC (point of common coupling) 120 represents a connection point or entry point of the consumer premises to grid 110.

Grid meter 112 measures the amount of energy drawn by a consumer connected to PCC 120. Grid meter 112 measures what is provided to the consumer from the grid. Typically, grid meter 112 is mounted on the monitored consumer premises just before the electrical distribution box or breaker box. System 100 does not necessarily show the power lines, which would come into enclosure 130 from the grid, but the lines to PCC 120 from grid meter 112 represents the monitoring of the electrical delivery. The line from meter 132 to PCC 120 represents the monitoring from behind the meter, or behind grid meter 112. Behind the meter refers to operation on the consumer side or internally within PCC 120, after the point monitored by grid meter 112. Operation behind the meter in system 100 can have an effect on what is seen and monitored by grid meter 112, without being directed by management of grid 110. In one example, operation behind the meter can be in response to dispatch or control commands from grid management, but can happen with equipment within the PCC. Grid meter 112 does not see or monitor or know what is happening with electrical operation along specific electrical circuit paths originating from enclosure 130. Rather, grid meter 112 sees the effects at PCC 120 at the point of monitoring.

In one example, enclosure 130 includes two meters or current sensors, meter 132 and meter 134. Meters 132 and 134 are internal meters, which monitor conditions behind the meter. It will be understood that "looking into" a coupling point or a node in an electrical system will give different results depending on which side of the node is looked into. In one example, meter 132 monitors the electrical conditions of grid 110 by looking into PCC 120 from behind the meter, or from the perspective of the consumer premises. The electrical characteristics as measured by meter 132 looking out through PCC 120 can be electrically different than what grid meter 112 sees looking into the consumer premises through PCC 120. In one example, meter 132 measures the same electrical conditions as grid meter 112 to enable system 100 to know how to operate to present a desired condition to grid 110. More details follow throughout the descriptions.

In one example, meter 134 monitors the local conditions, which includes one or more energy converters and can include energy production and energy storage. Meter 134 measures one or more electrical conditions as seen from within the consumer premises. While referred to as "meters," it will be understood that meter 132 to monitor the grid conditions and meter 134 to monitor the local conditions are separate from grid meter 112. Grid meter 112 represents a utility meter, which can be any type or form of energy meter or smart meter used by the utility to charge the consumer for electricity or power delivered to the consumer premises from grid 110. Thus, meters 132 and 134 are separate from grid meter 112 that measures power from the perspective of the grid side of PCC 120.

Grid meter 112 is used by the utility to charge a customer for power delivered by grid 110 to the consumer premises. In one example, meter 132 and meter 134 are located inside enclosure 130. In one example, meter 132 and meter 134 are mounted or have a display mounted on an outside cover of enclosure 130, such as on a lid of the enclosure, or mounted below the breaker box. Local system 170 monitored by meter 134 can include local loads and local production or energy generation devices.

In one example, local system 170 includes one or more power converters, represented by converter 172. Converter 172 represents power conversion hardware for local energy production of system 100. In one example, local system 170 includes energy production 174, which represents energy generation resources. Carbon-based generation (such as diesel generators) could be used, but typically, local energy generation represents devices such as solar systems or wind power energy systems. In one example, local system 170 includes local energy storage 176. Common energy storage includes batteries. Other types of energy storage can be used. In one example, local system 170 includes a converter 172 for energy storage 176, which can control how the energy storage is charged, and can control the discharge to actively generate reactive energy. In one example, local system 170 through converter 172 can perform reactive energy injection by natively generating reactive energy, electrically similar to a traditional spinning generator. In one example, converter 172 is a virtual spinning generator, which can allow the active generation of reactive energy from a non-spinning electrical circuit.

In one example, meter 132 is a four-quadrant meter. In one example, meter 134 is a four-quadrant meter. In one example, both meters are four-quadrant meters. Meters 132 and 134 can provide measurement data to controller 150. In one example, controller 150 is or is part of a gateway system represented by gateway 160. Controller 150 includes grid operating system intelligence, such as by executing an intelligent grid operating system (iGOS). In one example, controller 150 provides control to the one or more converters 172 for operation based on decisions made by the iGOS. In one example, controller 150 in enclosure 130 operates in conjunction with a separate controller of gateway 160 at the consumer premises.

In one example, gateway 160 is included within enclosure 130. In one example, enclosure 130 represents a breaker box replacement that enables an installation at a consumer premises to automatically convert the consumer premises into a smart premises. The smart premises can provide power management and power savings relative to traditional systems based on monitoring by the sensors in the system (described below), based on execution of an iGOS by controller 150, and based on operations by converters 172 located at the consumer premises and communicatively coupled to enclosure 130. The converters can carry out the decisions of the iGOS to adjust operation of the electrical system based on monitoring behind the meter.

A traditional system includes a grid-controlled grid meter 112 that measures usage over a month or other period for the consumer premises, and then the user receives a bill. Such a process provides data that is too vague to be very useful for controlling the usage at the premises. By contrast, system 100 provides realtime information and can generate realtime control based on the realtime data, to enable the system to adjust in realtime to the dynamic conditions of the grid and the dynamic conditions of the local system.

It will be understood that local system 170, while not specifically illustrated as being connected to the PCC, is electrically connected to the PCC. Converter 172 couples to an electrical node within system 100 that enables reactive power injection from the consumer side of PCC 120. Typically, converter 172 couples electrically through a breaker to be grid-tied. The energy production can include solar power, wind power, or other local generation.

In one example, enclosure 130 includes multiple breakers 140 such as a traditional breaker box. In addition to mounts for traditional circuit breakers, enclosure 130 includes current sensors 142 to monitor the realtime activity on each circuit. In one example, each breaker 140 is monitored by at least one current sensor 142. Current sensors 142 can detect the realtime current and power operation of the system. In one example, current sensors 142 can detect specific current signatures to specifically identify what load or loads are operating on an electrical circuit. With current signature information, system 100 can respond with energy management operations specific to the exact conditions of the power consumption and power generation of local system 170.

In one example, converter 172 can generate real and reactive power, or any mix or combination of real and reactive power. In one example, converter 172 generates reactive power with reactive power injection, to actively generate reactive power to inject into a connection point or node in the system, and thus to inject into grid 110 through PCC 120, as opposed to passively attempting to filter power factor. Traditional power factor conditioning involves reactive loading of the system so the phase of power delivered to the consumer premises at PCC 120 is in phase with the grid voltage. Reactive power injection provides energy as reactive power, instead of filtering to sink energy to adjust the reactive power conditions at a node. The filtering can also be referred to as adjusting the reactive power loading, which simply changes how the power is consumed, which consumes more power, and does not generate reactive power.

Current sensors 142 provide data back to the control system to enable controller 150 or gateway 160 to adjust operating conditions based on the realtime data. In one example, controller 150 or gateway 160 can include filters on the current sensor data. As explained in more detail below, current sensors 142 may be affected by power draw on proximate circuits. In one example, system 100 can adjust for the readings of the sensors to obtain accurate current readings to use as data input for the iGOS.

In one example, enclosure 130 also includes one or more environmental sensors 136. Environmental sensors 136 can include CO (carbon monoxide) or CO2 (carbon dioxide) sensors, seismic sensors, or other sensors, or a combination. As an example, CO2 sensors can be used to determine overall air quality or pollution. Determining air quality can enable the system to account for air quality in power use decisions. As another example, seismic sensors can be used to provide data related to the occurrence or potential for earthquakes. With such sensors spread through a community in enclosure 130 spread throughout a community in various consumer premises, there can be a wealth of information built right into the infrastructure of the community without requiring other equipment. Additionally, the monitoring of the air quality can provide community information based on the spreading of sensors across the community. Such community information can be provided back to a regulatory agency, or other group or agency that makes use of the data for public information or service.

In one example, gateway 160 includes analytics to make computations based on the metering. In one example, gateway 160 also has security and a connection to the utility. In one example, gateway 160 or controller 150 are capable of dispatch control from grid 110. Gateway 160 can enable the application of grid level control to the consumer based system, in addition to the control based on analytics from local sensor data.

Typically, a utility wants to control grid support and set configuration, such as setting a power factor, based on what it sees looking downstream. The utility is interested in seeing compliance with the configurations at the PCCs, as viewed from the grid side. The grid traditionally obtains status and sends out dispatch information. Depending on how the power grid looks, the utility may determine that it wants to see certain loads removed or certain power sources removed from the grid. Such an approach can end up taking power off the grid instead of using the sources available. In contrast to a traditional system, system 100 can identify the specific needs of the consumer premises, address the needs behind grid meter 112, and present compliance with the grid at PCC 120. System 100 can handle compliance behind the meter in a way different from the dispatch information of the grid control, by handling reactive power needs internally and presenting a specific current vector at PCC 120.

In one example, gateway 160 learns when system 100 operates at its peak load and its peak production. It can learn when specific loads are used based on the monitoring by current sensors 142. Gateway 160 can learn over time how to customize to a particular user, which use will be different from one customer premises to another. The different usage is defined by usage conditions and assets, rates, and tiers. In one example, system is capable of local dispatch control, which can be understood as control behind the meter to supplement the dispatch control, based on data driven decision making. The decision making is based on data gathered locally by current sensors 142, and potentially other sensors.

In one example, gateway 160 can control the entire consumer premises for dynamic phase angle changes as seen from PCC 120, and adjusts the operation of multiple converters 172 to achieve the desired output. In one example, gateway 160 can perform entire consumer premise disconnection in response to an anti-islanding event. As such, a few signals to gateway 160 can disconnect the entire consumer premises instead of needed to have each converter 172 detect and respond to the anti-islanding event.

Figure 2:
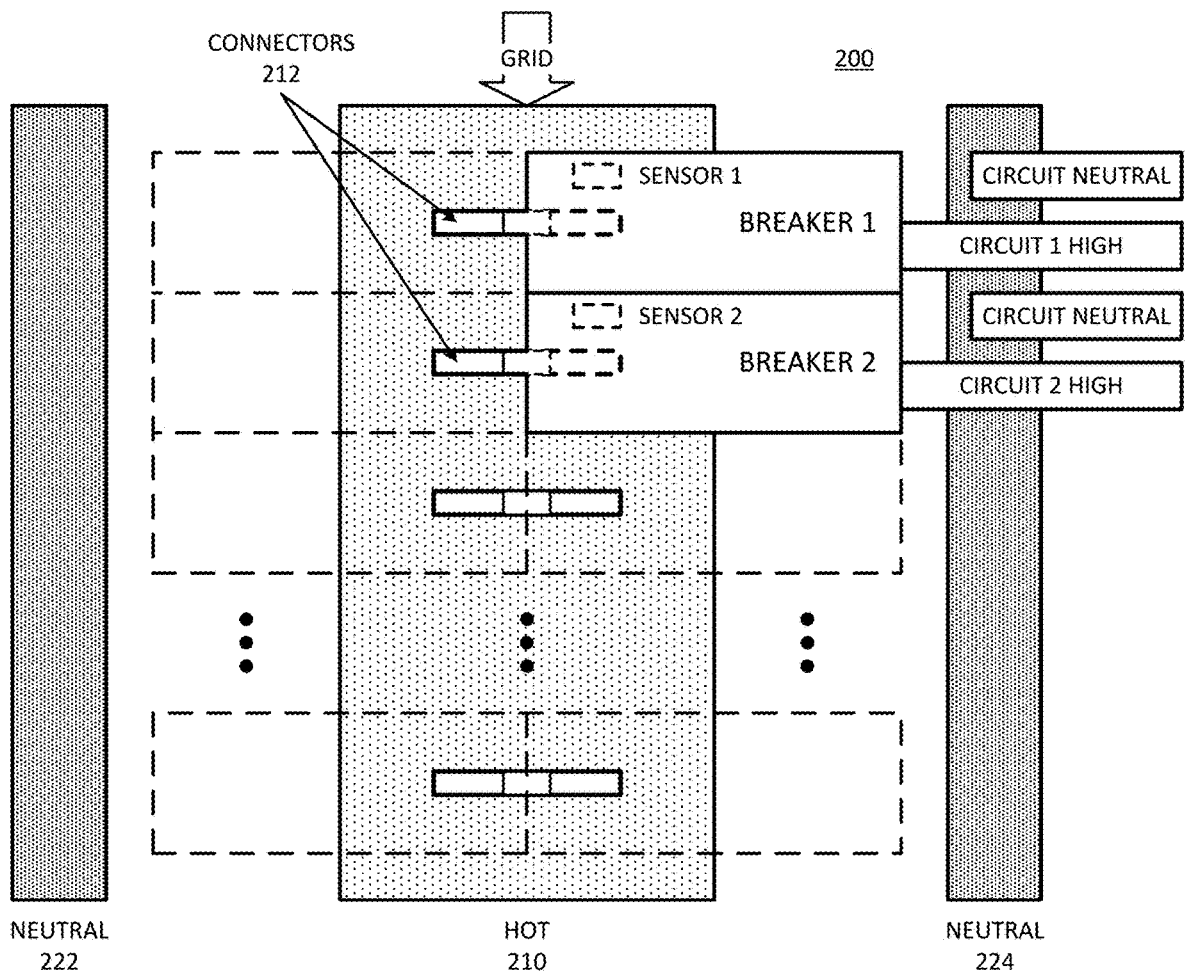
FIG. 2 represents an example of a breaker circuit for an enclosure for an intelligent grid operating system.

FIG. 2 represents an example of a breaker circuit for an enclosure for an intelligent grid operating system. Circuit 200 represents a circuit that can be implemented in the enclosure of system 100.

Circuit 200 includes hot (high voltage) and neutral connection points. A hot connection refers to an electrical connection to the grid consumer high voltage line (typically either 120 V or 240 V). The neutral connection point is the reference voltage (circuit ground) or the voltage from which the high voltage is referenced. Hot 210 represents a plate or connector to high voltage. Neutral 222 and neutral 224 represent connectors to the reference voltage. Circuit breaker, or simply "breakers," span between the high voltage source and the circuit high voltage wire. As illustrated, Breaker 1 connects to connector 212 and spans between hot 210 and circuit 1 high. Breaker 2 connects to a different connector 212 and spans between hot 210 and Circuit 2 High. Dashed lines illustrate where other circuit breaker could be located in circuit 200. There can be more rows of circuit breakers than what is illustrated in circuit 200.

The circuit neutral for both circuits connects with neutral 224. Neutral 222 and neutral 224 are coupled to each other and appear on different sides of circuit 200 simply for connection to the circuit controlled by the circuit breakers. If a circuit through a breaker tries to pull too much current, the breaker trips in response to the excess current flowing through the breaker.

In one example, circuit 200 includes current sensors located proximate each circuit breaker. As illustrated, Sensor 1 monitors the current of Breaker 1 and Sensor 2 monitors the current of Breaker 2. The current through the breakers is the current for the electrical circuit controlled by the breakers.

It will be understood that if hot 210 is a plate or a conductor to provide an electrical connection of the breakers to the grid power, the current will flow out from the connection point of the grid to the electrical conductor of hot 210. Consider that the grid connection is at the top of the diagram as illustrated in circuit 200, as illustrated by the arrow labeled "GRID." If current flows from the point of the arrow, the current will flow down hot 210 to the circuit breakers. Circuit breakers at the bottom of circuit 200 will have a longer electrical path along hot 210 before connecting. In one example, Sensor 1 monitors the current drawn through Breaker 1. Similarly, Sensor 2 monitors the current drawn through Breaker 2. Sensor 2 can be considered to monitor the current for Breaker 1 and Breaker 2, because the current flows down. Sensor 1 cannot measure the current through Breaker 2 if the current flows down. In one example, a controller can determine the current flow through Breaker 2 by subtracting the reading of Sensor 1 from the reading of Sensor 2. It will be understood that a similar process could be in place for other sensors (not specifically shown).

In one example, there is not a direct flow of current through each sensor. In one example, the system can calibrate the sensor readings. For example, the system can measure Sensor 1 with no current drawn in circuit 1, then with a known load. The system can also measure Sensor 2 with no load in circuit 2 while circuit 1 is loaded to see if the reading change. Similarly, the system can measure other sensors in a similar fashion with different known load currents in one or more other circuits. As such, the system can be calibrated to ignore interference by normalizing the readings of each sensor based on calibration or training.

In one example, the system accounts for different currents across the different sensors. For example, the system can identify specific currents for specific circuits by comparing the current measured by one sensor against the current measured for another sensor. In one example, the system performs calibration by running test currents through the different lines to determine how they affect the current in other sensors. The calibration can determine sensor noise floors when other currents are flowing. The system calibrates for the induced currents and can account for these currents in subsequent measurements. In one example, the system is calibrated at manufacture to determine how different currents affect the different sensors. In one example, the system is calibrated after installation in a consumer premise. The calibration can enable the system to account for current measurement affects at the sensors that are caused by the EM (electromagnetic) waves produced when a current flows in a different circuit.

Figure 3:
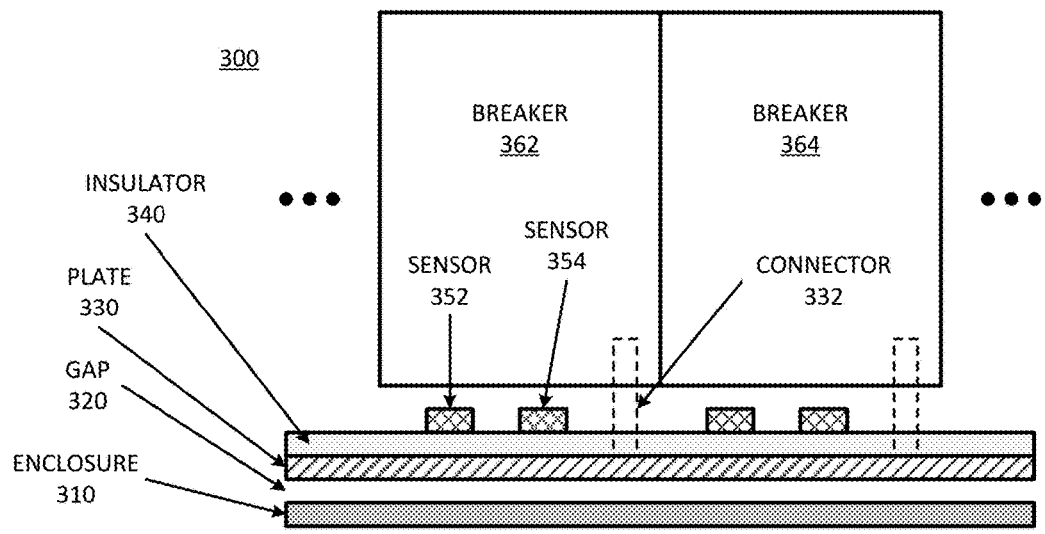
FIG. 3 represents an example of current sensors mounted under breakers on a charge plate of a breaker enclosure.

FIG. 3 represents an example of current sensors mounted under breakers on a charge plate of a breaker enclosure. Circuit 300 provides one example of a breaker circuit in accordance with circuit 200 of FIG. 1. Circuit 300 provides an example of a breaker circuit that can be implemented in enclosure 130 of system 100.

Circuit 300 is illustrated from a side view. Relative to circuit 200, circuit 300 can illustrate a view from the side of an example of breaker 362 as Breaker 1 and breaker 364 as Breaker 2. Breaker 362 and breaker 364 would extend into the page to span between the hot and neutral contacts, to provide a protected hot connection close to the neutral line.

In one example, circuit 300 is implemented in an enclosure, with layer 310 representing the back of the enclosure. The back of the enclosure is the part to which the circuit breaker circuits are mounted. In one example, there is a gap 320 between enclosure 310 and the electrical plate 330 that represents a conductor to connect to the grid-tie connection. Gap 320 electrically separates the grid high voltage from the enclosure box. The breaker circuits are mounted by a means that provides electrical separation between enclosure 310 and the high voltage supply.

In one example, circuit 300 includes an insulator 340 between plate 330 and the current sensors. In one example, insulator 340 can be a circuit board to which the sensors are mounted. In one example, insulator 340 is an electrical insulator that covers the high voltage conductor. In one example, insulator 340 represents an electrical insulator that covers the high voltage conductor, and there is also a circuit board to which the current sensors are mounted, which goes under the circuit breakers.

The current sensors are shown as sensors 352 and 354. In one example, each sensor has a separate circuit board. In one example, both sensors are on the same circuit board. In one example, a single circuit board is beneath all breakers in the system. Thus, the unlabeled sensors under breaker 364 could potentially also be on the same circuit board.

Connector 332 represents the connector from plate 330 to breaker 362. A similar connector exists for breaker 364. In one example, the current sensors are placed as close as reasonable to the connectors. Thus, sensors 352 and 354 can be mounted physically close to connector 332. If the sensors are mounted too closely, there may be significant noise. Mounted too far away can reduce the precision of the readings. The proximity will depend on the potential currents through the circuits as well as the sensors types and the physical layout and configuration of the enclosure.

Connector 332 represents a contact to the electrical supply for breaker 362. The contact provides a connection to plate 330 to connect to the grid, to provide power to the electrical circuit when connected. In one example, the current sensors are all integrated circuit (I/C) devices mounted close to connector 332. The sensors generate current sense data for the electrical circuit that they can sent to a controller. Depending on the sensors used, in one example, sensor 352 and sensor 354 can provide data to indicate real and reactive power draw of the electrical circuit. In general, the current sensors can provide data related to real and reactive power draw of their respective electrical circuits. While one circuit is shown and described in detail, it will be understood that one or more sensors can be mounted under breaker 364 for its electrical circuit, and so on for other circuit breakers.

Based on the data provided by the current sensors, a controller can compute real and reactive power information for individual electrical circuits. Based on combined data from multiple sensors, the controller can determine real and reactive power consumption of the entire consumer premises. In one example, depending on current flow based on physical layout of the circuitry, the readings of one sensor could be adjusted based on the readings of another sensor to compute the current. For example, consider that sensor 354 monitors current for breaker 360, and sensor 352 monitors current for another breaker (not shown) that also connects to the same connector 332. The system can be calibrated to account for the influence of one circuit on the other sensor. Thus, current vectors for the different circuits can be calculated by adjusting the readings relative to the other sensor. Additionally, the sensor readings can be adjusted based on interference from other circuits.

Figure 4:
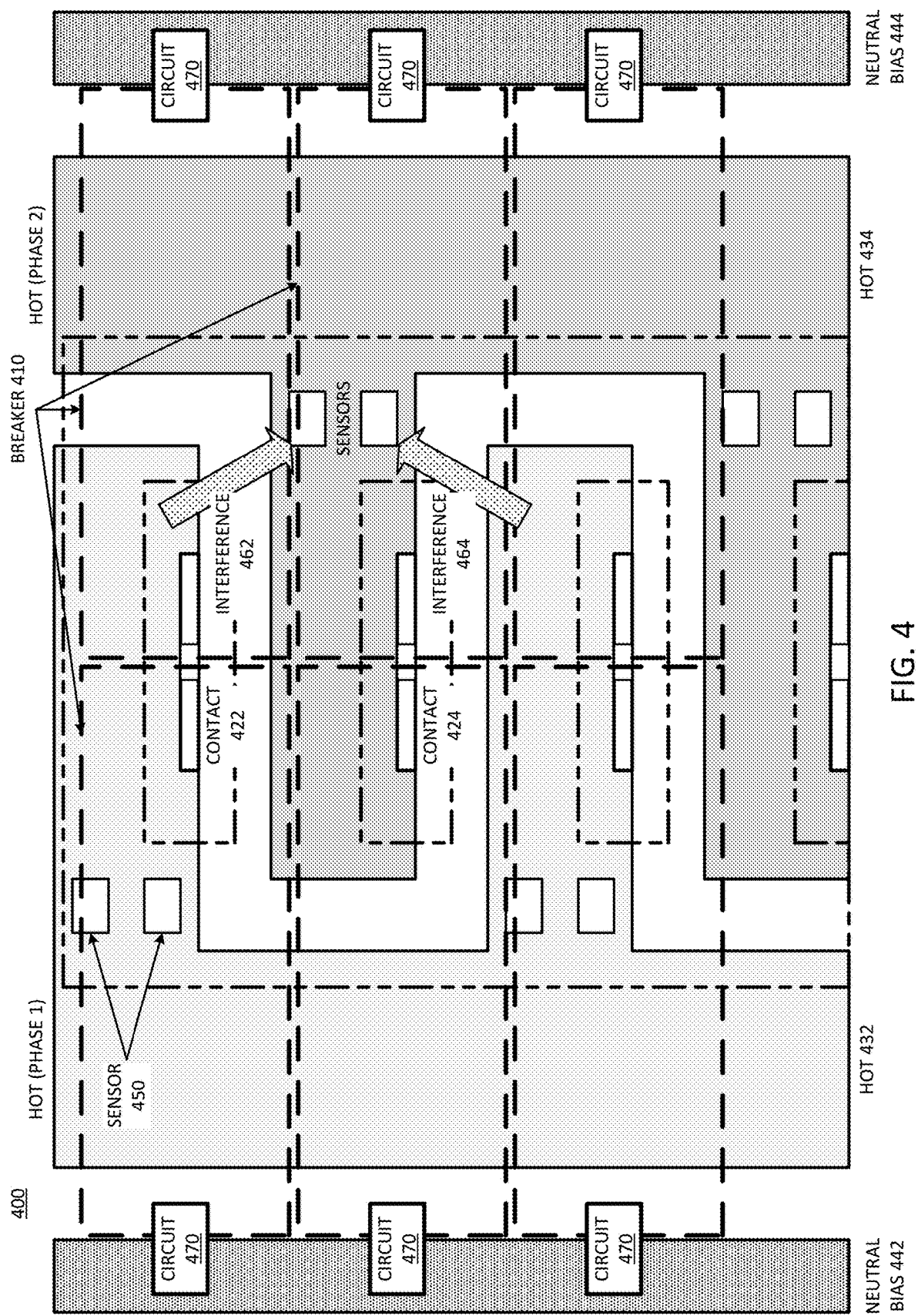
FIG. 4 represents an example of current sensors in a breaker enclosure for an intelligent grid operating system.

FIG. 4 represents an example of current sensors in a breaker enclosure for an intelligent grid operating system. Circuit 400 provides an example of a breaker circuit in accordance with circuit 200 of FIG. 1. Circuit 400 provides an example of a breaker circuit that can be implemented in enclosure 130 of system 100. Circuit 400 illustrates an example of a circuit in accordance with circuit 300 in which the high voltage line is separated into two high voltage lines to accommodate multiple phases.

The lighter colored shapes represent high voltage bus bars (often referred to as the "hot" line). The darker colored shapes represent neutral bias conductors, and circuit neutral lines are typically connected to the bias line. Hot 432 is the lightest colored shape, and host 434 is darker than hot 432 and lighter than the neutral bias. Neutral bias 442 and neutral bias 444 have the same shading to represent that they are typically tied. They could be separate neutral lines in a different implementation. In one example, hot 432 is a separate phase than hot 434.

The circuit high voltage wires are connected to the breakers, which trip to open the electrical circuits when current passes the threshold of the breaker. It is well understood that different breakers have different thresholds. The neutral bias lines typically connect to the main neutral, which is not illustrated for simplicity. Likewise, the high voltage conductors are connected to the main high voltage lines, not illustrated for simplicity. The different buses can be different phases, but in one example all circuits can be tied to the same phase.

Circuit 400 illustrates multiple dashed boxes, which represent the location for breakers 410. When installed, breakers 410 sit on top of or over the circuitry shown. Breakers 410 are to connect between respective hot and neutral connectors. As illustrated, host 432 is Phase 1, and the conductor has arms that extend under the breakers. Circuit 400 specifically illustrates contact 422, which can provide a contact for one breaker 410 from hot 432 toward neutral bias 442. Another breaker 410 will connect to contact 422 (e.g., another post on the contact) and span toward neutral bias 444. It will be understood that the breakers may only connect electrically to the host line, and the neutral bias conductors provide a place to connect the circuit neutral close to where the circuit hot connects to the breaker to provide a consistent current path. Otherwise, any neutral could theoretically be used, but differences in electrical paths could create unexpected connection issues.

In one example, the circuitry includes a PCB or other circuit board to mount a current sensing I/C (integrated circuit) devices, such as sensors 450. The dashed-dotted line illustrates an example of an outline for a circuit board that could be used, with cutout sections for the contacts. The shape of the illustration is intended only as an illustration, and is not necessarily representative of correct proportions. In one example, the circuit board can function to provide the correct spacing of sensors 450 to the contacts, similar to what is described previously, and will change with different devices and system architectures.

In one example, sensors 450 are implemented as standalone I/C devices (such as discrete components) or circuitry directly integrated onto the circuit board or substrate board. In one example, hot conductors 432 and 434 each includes multiple arms that connect to the contacts in the middle, as illustrated. In one example, each arm includes contacts for one breaker to connect toward the neutral on the right and one breaker to connect toward the neutral on the left. As illustrated, contact 422 is connected to hot 432 and contact 424 is connected to hot 434. Both contact 422 and contact 424 have two contact points for breakers to span each direction. The breakers can be mounted and wired as different electrical circuits, as is understood in the art.

In one example, each arm includes a contact for one or more breakers. In the example illustrated, each arm of the high voltage conductors supports connection to two breakers, one to the left and one to the right. In one example, circuit 400 includes one or more current sensors 450 under or over the high voltage conductor (hot 432 or hot 434). In one example, the sensors 450 are Hall effect I/Cs. Other integrated current sensors could be used. In general, integrated current sensors utilize the Hall effect to detect a current based on the emitted EM radiation from the line. In one example, sensors 450 are placed as close to the contacts (e.g., 422, 424) as possible, which can provide a more accurate reading. In one example, multiple sensors 450 are used, and a controller compares the measurements to provide a more accurate reading. In one example, multiple sensors 450 are used, and the different sensors measure the different circuits. Other configurations of sensors can be used. In general, current sensors 450 are placed in a proximity to the connection to provide measurements sufficient to identify the current signature of one circuit over another.

Sensors 450 can be influenced by current drawn by other circuits on the same phase. As illustrated, circuit 400 includes sensors 450 in pairs, a pair on each arm of each high voltage conductor. In one example, one sensor 450 measures the circuit that extends to the right and the other sensor measures the current of the circuit that extends to the left from the same contact. For example, the two sensors 450 identified in circuit 400 measure different circuits 470 from the same contact 422. One sensor measures the current for circuit 470 to the left and the other measures the current for circuit 470 to the right. The current from the other circuit can influence each sensor, and their readings can be calibrated and adjusted as needed to filter the interference from the adjacent circuit.

Additionally, sensors 450 on one arm of one phase can be influenced by the current drawn by another circuit. The arrows represent interference EM radiation that can be received from other circuits. Interference 462 represents potential interference from the circuit or circuits that connect to contact 422. Interference 464 represents potential interference from the circuit or circuits that connect to the contact of the other arm of host 432. The interference influences that sensors that measure current for the electrical circuits that connect to contact 424 for the arm of hot 434.

In one example, a technician calibrates each sensor 450 by loading each circuit in turn to determine how the sensors respond to the different interference signals. In one example, sensors 450 include identifiers or other positional indications to indicate the circuit or circuits they monitor. The system can set offsets for the sensors based on identifier to adjust specific measurements or readings to account for different circuit interference. Thus, each sensor 450 can provide an accurate reading of the current for the system to determine how current is flowing through the enclosure to the various circuits. Based on this information, the meters and an iGOS can make calculations to determine how to operate local power converters.

Figure 5:
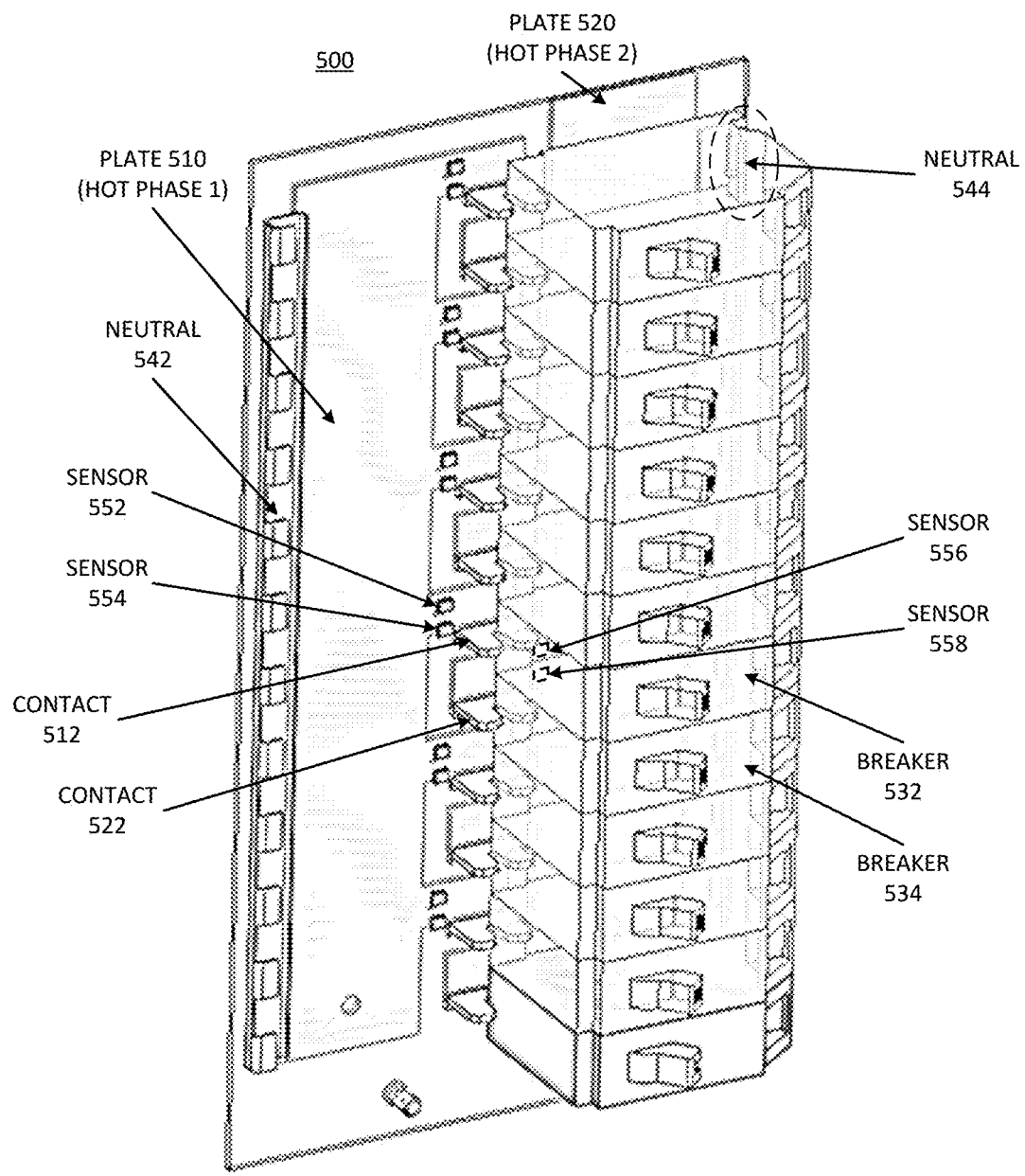
FIG. 5 is a circuit representation of an example of a breaker circuit for an enclosure for an intelligent grid operating system.

FIG. 5 is a circuit representation of an example of a breaker circuit for an enclosure for an intelligent grid operating system. Circuit 500 provides an example of a breaker circuit in accordance with circuit 200 of FIG. 1. Circuit 500 provides an example of a breaker circuit that can be implemented in enclosure 130 of system 100. Circuit 500 illustrates an example of a circuit in accordance with circuit 300 in which the high voltage line is separated into two high voltage lines to accommodate multiple phases.

The breakers are shown spanning between power and neutral. The circuit breakers provide breaker protection for a circuit, and extend the high voltage line to a connector on the breaker for high voltage. In one example, the circuit breaker also has a contact to connect to neutral to allow a neutral connection for a specific circuit. Thus, both high voltage (the protected line) and neutral can be connected to the same breaker for an electrical circuit.

Circuit 500 illustrates plate 510, which is hot for phase 1, and plate 520, which is hot for phase 2. In one example, all high voltage plates are connected to a single phase. Neutral 542 is illustrated to one side, and neutral 544 is illustrated to the other side. Neutral 544 will be understood to be obscured by the breakers.

Circuit 500 illustrates sensors 552 and 554 proximate contact 512. Breaker 532 is connected to contact 512, and spans between plate 510 and neutral 544. Another breaker can be installed to connect to contact 512 to span between plat 510 and neutral 542. Sensors 552 and 554 measure the currents of the circuits of breaker 532 and another breaker connected to contact 512. In one example, sensor 554 monitors the circuit for the missing breaker that would connect to contact 512 (to extend towards neutral 542) and sensor 552 monitors the circuit for breaker 532. In one example, both sensors measure both circuits, and a controller computes the current vectors from sums and differences of the sensor data.

Circuit 500 also illustrates sensors 556 and 558 under the circuit breakers. Sensors 556 and 558 are mounted on or near the arm of plate 520 that includes contact 522 to which breaker 534 connects. The descriptions for sensors 552 and 554 can apply similarly to sensors 556 and 558 for the other side. In addition to circuits from breakers connected to the same contact having an electrical influence on the current sensors, in one example, adjacent circuits of different contacts can also influence current sensors. For example, either sensor 556 or sensor 558 or both may be influenced by current drawn through breaker 532, even when it may be connected to a different high voltage phase. Calibration could account for that interference as well as same-contact interference.

In one example, the current sensors represent sensor I/Cs. In one example, the current sensor I/Cs are passive sensors. The four quadrant meters can be considered active sensors, because they create data from their monitoring. The current sensors can provide data related to specific currents drawn on specific circuits. The meters can provide overall current and voltage readings for the system. Together the sensors provide data to a controller to monitor the current through the circuits.

Figure 6:
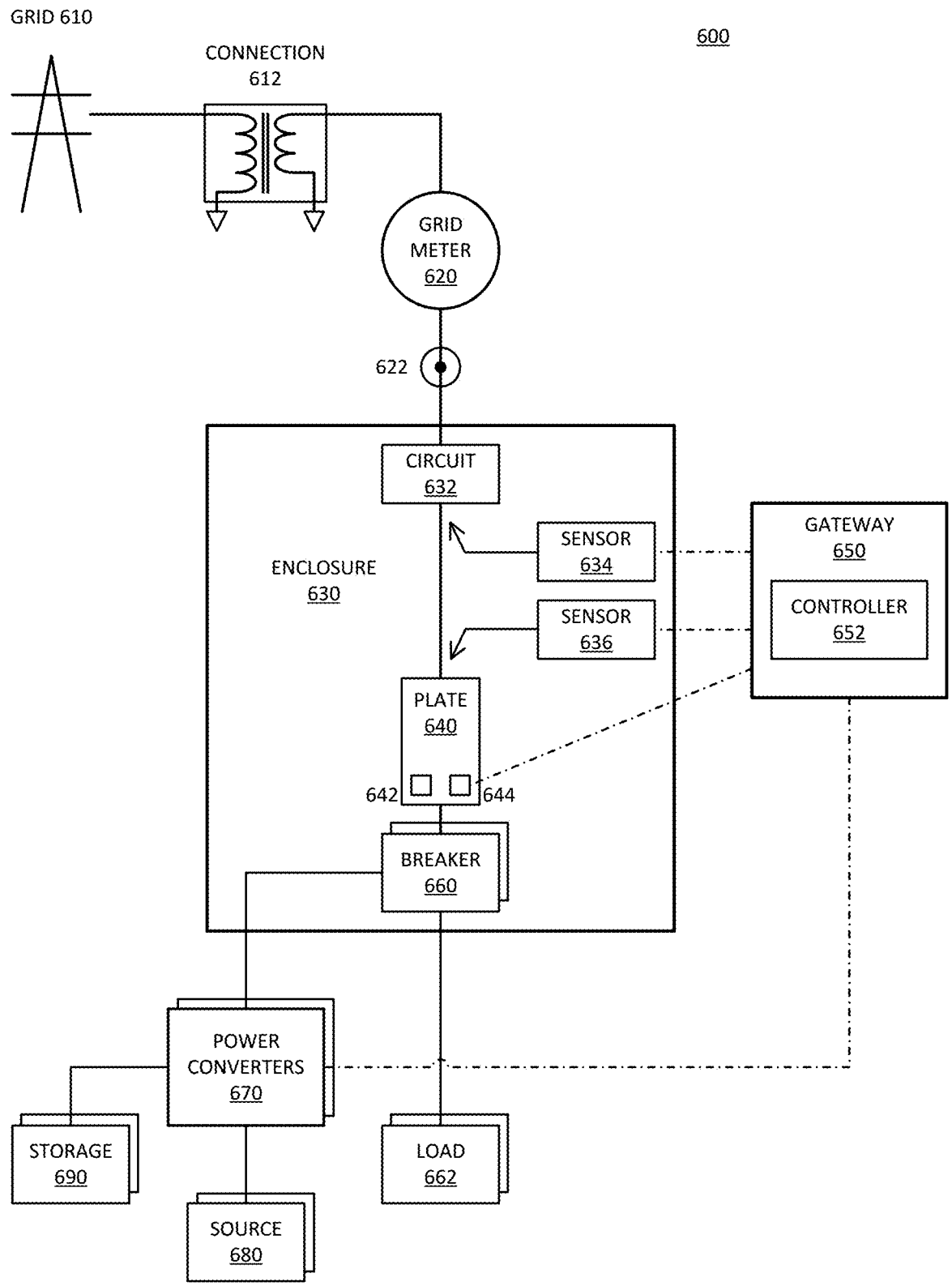
FIG. 6 is a block diagram of an example of a system with internal current sensors.

FIG. 6 is a block diagram of an example of a system with internal current sensors. System 600 provides an example of a power system. System 600 can be one example of a system in accordance with system 100.

Grid 610 represents a utility grid that provides power to consumer premises from one or more grid-managed generators, which may include distributed generators. Connection 612 represents a substation or power transformer or other infrastructure to step down the very high voltage transmission line of grid 610 to a consumer high voltage (e.g., 120 V, 220 V).

Grid meter 620 represents a grid meter, as has been described previously. The utility charges the consumer based on measurements made by grid meter 620 to monitor power delivered from grid 610 to the consumer premises through PCC 622.

Enclosure 630 represents an electrical enclosure at the consumer premises. Circuit 632 represents a connection circuit to receive the utility connection. In one example, the circuit can be a simple transmission line connection. Alternatively, isolation hardware or other circuitry can be included.

Plate 640 of enclosure 630 represents an electrical conductor to provide grid power to multiple circuit breakers represented by breakers 660. Breakers 660 represent any number of circuit breakers that can be included in enclosure 630. In one example, enclosure 630 includes sensors 642 and 644 to measure currents for electrical circuits provided by breakers 660. The sensors can be in accordance with any example herein.

In one example, enclosure 630 includes sensor 634 to monitor the connection to grid 610. Sensor 634 can be referred to as grid facing, as it measures the current waveforms as seen looking into the grid connection. In one example, enclosure 630 includes sensor 636 to monitor the connection to the electrical components of the consumer premises. Thus, sensor 636 can be said to be consumer facing, as it measures the current waveforms as seen looking into the local system at the consumer premises. In one example, there are multiple consumer facing sensors 636.

Sensor 634 and sensor 636 could be referred to as meters in the sense that they monitor the power use at the consumer premises. However, they are understood to be separate from grid meter 620. Additionally, whereas grid meter 620 generally tracks measurements used to determine power usage, sensors 634 and 636 can be used to generate current waveform data. The current waveform data can enable system 600 to operate in different current zones based on comparison of the local current waveform with the grid waveform.

System 600 includes loads 662, which represent the local loads at the consumer premises. The loads are any devices (e.g., lights, heating, air conditioning, refrigeration, electronics, or others) that consume electricity to operate. Source 680 represents any energy generation device, which is a device that generates energy as it operates, such as solar or wind generators. Storage 690 represents a device that stores energy to be usable in a time-delayed manner, such as a battery.

In one example, system 600 includes power converters 670, which represent power converters in accordance with any example described. In one example, each storage device 690 has at least one associated power converter 670. In one example, each source 680 has at least one associated power converter 670. In one example, power converters 670 provide energy back into enclosure 630 to be distributed to one or more circuits of breaker 660.

In one example, system 600 includes gateway 650 to manage power usage at the consumer premises. In one example, some or all of gateway 650 is incorporated into enclosure 630. In one example, gateway 650 has a separate electrical box communicatively coupled to components of enclosure 630. Gateway 650 includes at least one processor device, represented by controller 652. In one example, controller 652 represents an embedded computer. Controller 652 performs computations to generate current waveforms and performs computations to determine how to control operation behind the meter at the consumer premises to control what power consumption is seen at PCC 622 by grid meter 620. Controller 652 represents hardware to execute an iGOS.

The dashed lines illustrate communication in system 600. In one example, gateway 650 or controller 652 receives sensor data from sensor 634 to provide grid conditions and sensor data from sensor 636 to provide local conditions. In one example, gateway 650 or controller 652 receives information from sensors 642 and 644 to indicate current information for various specific electrical circuits in the consumer premises. In one example, gateway 650 or controller 652 provides one or more commands to one or more power converters 670 to change operation of the selected power converters. The change in operation of the selected power converters can change the consumption of power as seen from the grid side. The change in operation can generate reactive energy to inject into the electrical circuits to satisfy reactive power demand, or to inject reactive power out to grid 610.

In one example, controller 652 computes a quadrant of operation of the current waveform for the local system. Controller 652 can compute a desired quadrant of operation for the local current waveform based on a quadrant of operation of the current waveform for the grid. If the current waveform for the local system is not the desired operation, the controller can send one or more commands to power converters 670 to adjust operation. Power converters 670 can adjust a mix of real and reactive power to shift the local current waveform into the desired quadrant of operation. In one example, the power converters simply convert more real power into reactive power. In one example, the power converters convert more generated energy from source 680 into reactive energy to inject back into the system. In one example, the power converters convert stored energy from storage 690 into a mix of real and reactive energy to inject back into the system. Any of these actions or a combination of these actions can change the operation of the local current waveform to the desired quadrant.

In one example, one or more loads 662 (e.g., an air conditioner) can have a power converter 670 to manage the power consumption of a particular load. For example, certain loads 662 have a high reactive power demand. In one example, power converter 670 can draw real power from grid 610 and convert the real power locally into reactive power. Thus, rather than changing the reactive loading of the consumer premises as traditionally done, power converter 670 can draw only real power from the grid, which is electrically isolated from its output. Thus, grid meter 620 will see only real power draw by the consumer premises. However, the electrical isolation of power converter 670 between its input and output can provide a local reactive power output to satisfy the demands of a specific load 662. Thus, a reactive load can appear to the grid to draw only real power. Thus, although the connection lines go from load 662 to breakers 660, in one example, at least one load 662 could be coupled to breaker 660 through power converter 670.

Figure 7A:
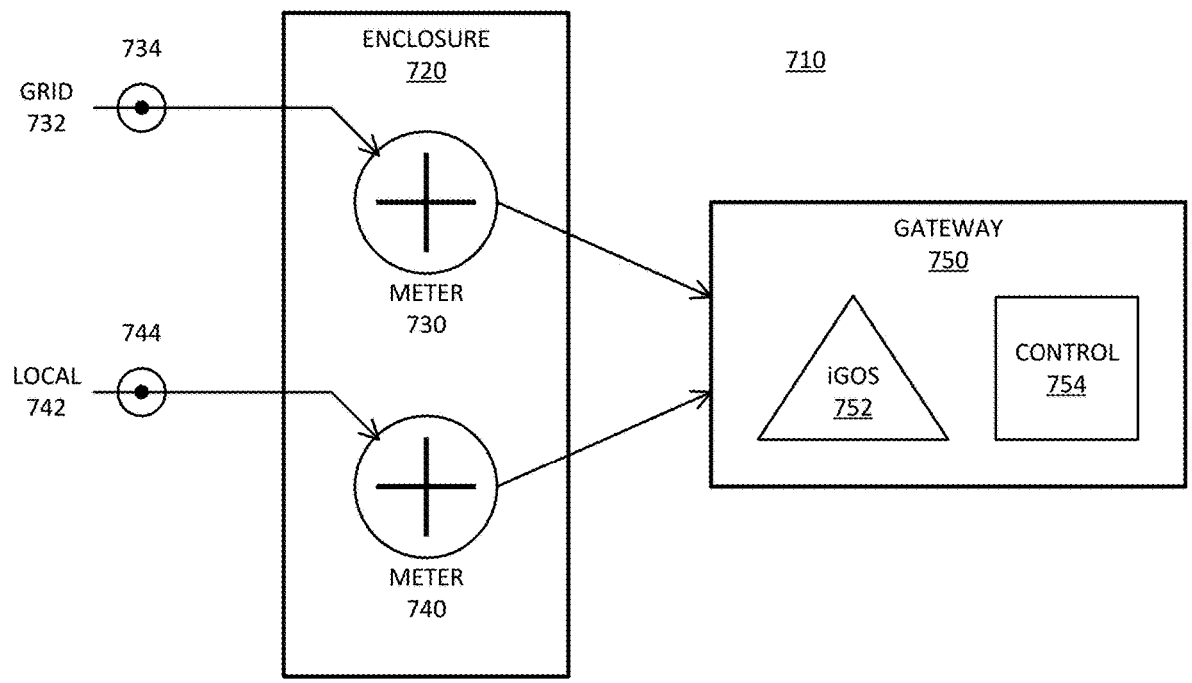
FIG. 7A is a block diagram of an example of an enclosure with multiple meters.

FIG. 7A is a block diagram of an example of an enclosure with multiple meters. System 710 represents a system in accordance with system 600. System 710 includes enclosure 720 with meter 730 and meter 740. System 710 also includes gateway 750.

Enclosure 720 can include electrical distribution hardware for a consumer premises, in accordance with what is described above. It will be understood that meter 730 and meter 740 are labeled as meters for simplicity in description, but may not be considered meters in the traditional sense that they do not monitor power usage for charging a consumer. In one example, meter 730 and meter 740 do not measure power consumption in the same sense as a utility power meter. In one example, meter 730 and meter 740 sense data to compute current vectors to represent the conditions, respectively, of the grid and of the local system.

In one example, meter 730 generates data readings of the current of grid 732 as seen looking into PCC 734, which is the connection point of the consumer premises to the grid. Based on the data readings, a controller can calculate a current vector for the current as seen at PCC 734. The current vector has a magnitude and a direction, which in one example is mapped onto a 4-quadrant unit circle. The mapping of the current vector onto the unit circle can identify a combination of real (x-axis) and reactive (y-axis) power. In one example, the controller can set the grid current vector as the unit for the circle.

In one example, meter 740 generates data readings for the current of the local system, local 742, as seen looking into connection point 744. Connection point 744 represents a node within the consumer premises. The controller can compute a current vector for the local system to compare against the grid vector. In one example, the controller maps the vector onto the unit circle. The magnitude can represent an amount of resources available to the local system to adjust the local operation to change what is seen by the grid.

In one example, meters 730 and 740 provide their data to gateway 750 that implements iGOS 752. In one example, gateway 750 includes control 754, which represents a controller to perform the calculations. Control 754 can also represent the control signals to send to one or more power converters (not illustrated) of the consume premises.

Figure 7B:
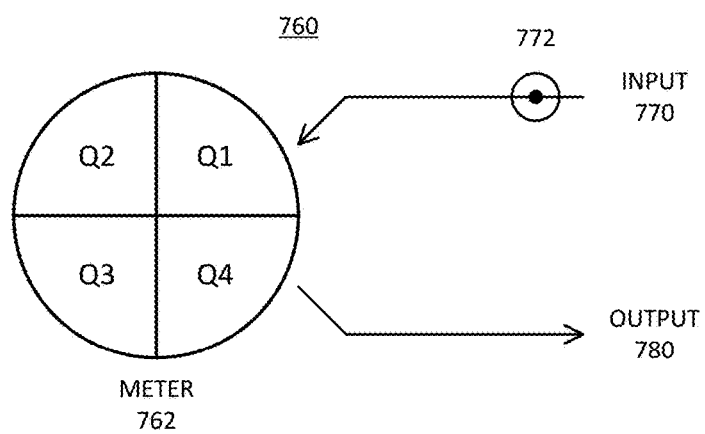
FIG. 7B represents an example of a 4-quadrant meter.

FIG. 7B represents an example of a 4-quadrant meter. Diagram 760 represents an internal meter 762 with input and output. The internal meters in any of the previous systems can be 4-quadrant meters. A 4-quadrant meter receives measurement data for a monitored point. The monitored point can be or include a solar system or other power generation. The monitored point can couple to a battery or other storage. The monitored point can include a power converter. The meter can provide output data to gateway 750. Gateway 750 represents a controller or "smarts box" that includes computer control 754 to manage the energy generation and implement intelligence such as iGOS 752.

Meter 762 represents an example of either meter 730 or meter 740, or both meter 730 and meter 740. Meter 762 receives as input 770 the sensor or data measurement for the monitored node, such as described in the previous paragraph. Node 772 represents the monitored node, whether grid facing or consumer facing, depending on where meter 762 is implemented. Meter 762 generates output 780, which represents the measurements generated. In one example, meter 762 generates current vector information. Meter 762 can provide output data to gateway 750. In one example, meter 762 provides output to a controller in a circuit breaker enclosure box.

In one example of an enclosure, there are two meters implemented in accordance with meter 762: one for local power generation and one for the PCC. In one example, the system includes an additional meter for a battery subsystem. In one example, each meter provides 4-quadrant monitoring of current for the monitored node, generating current vector information to provide to the iGOS to control the operation of the system to control how the power looks at each monitored node. By measuring behind the grid meter, the system can change the quadrant of operation behind the meter to cause the grid to see different operation at the consumer premises when looking from the grid side of PCC 734.

In one example, a 4-quadrant meter can utilize a peripheral interface bus (e.g., an SPI bus) instead of serial ports, as is traditional with meter components. The SPI allows the meter to communicate information on a message basis instead of on a byte-by-byte basis. The message allows the meter to provide more or less information than a byte. In one example, meter 762 accumulates information and provides more than a byte of information at a time. Meter 762 can still service the messages per byte but allows the transfer of more information. The additional information can allow the system more data regarding what is happening, whereas byte-by-byte communication in a serial port may not provide sufficient information in a timely enough manner to make the computations needed to track specific current information. Thus, meter 762 can provide increased information to the system as compared to traditional meters.

In one example, meter 762 includes a timer that is set up with a DMA (direct memory access) service functionality to provide data directly to a memory. Such setup with a timer and DMA can allow the bypass of certain portions of the processing stack. When configured as mentioned above to allow message by message communication, meter 762 can measure information directly into memory for analysis at the meter, by a processor that implements the measurement code. Such a setup enables the transfer of more metering data within a processing window to provide more time to make computations on the meter data. As such, the system can utilize finer-grain meter control within the system to make decisions regarding the operation of the converters and the generation of reactive power behind the grid meter.

In one example, the SPI interface is a synchronous interface. In one example, the DMA is implemented as a circular buffer. The code controlling meter 762 can overwrite the setup timers to know when to read the data from the DMA buffer. The code can keep track externally of the start and stop of the meter data. Keeping track of the start and stop externally can be accomplished through an added abstraction layer on the meter processing algorithm. As such, the code can organize the meter data into bytes, where a byte of data, for example, can represent a reading. Such an approach gathers power data much faster than traditional approaches. The increased speed can enable accumulating and averaging power information right at the meter without having to use an external controller.

In one example, meter 762 stores data for transfer to an iGOS controller, whether locally at the circuit box, or to an external gateway, or both. In one example, meter 762 has logging build right into the meter. The logging can store thresholds for the storing of data. For example, if certain data exceeds certain thresholds, it can be flagged as an anomaly and dumped, for example, when data looks like a spike compared to other data around it. In one example, the iGOS system can poll meter 762. In one example, meter 762 pushes data to the iGOS. In one example, meter 762 follows a schedule of data transfer to the iGOS system.

Figure 8:
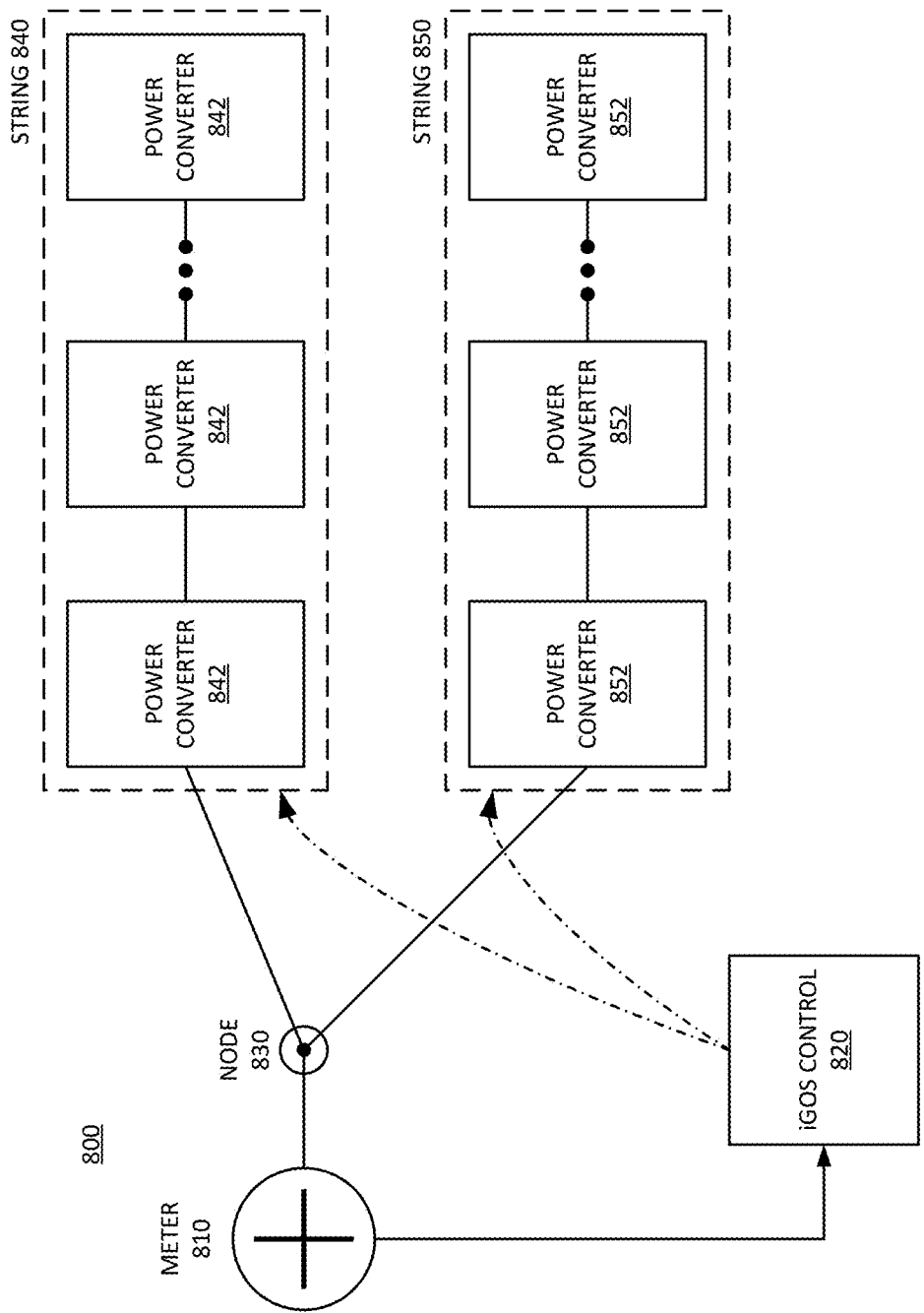
FIG. 8 is a block diagram of an example of system with a 4-quadrant meter to monitor one or more strings of power converters.

FIG. 8 is a block diagram of an example of system with a 4-quadrant meter to monitor one or more strings of power converters. System 800 provides an example of a system in accordance with system 100 of FIG. 1, or with system 600 of FIG. 6. System 800 specifically illustrates meter 810 coupled to multiple strings of power converters.

Meter 810 represents an internal meter or internal sensor in accordance with any example described. In one example, meter 810 is a 4-quadrant meter. In one example, meter 810 is a meter in an enclosure with circuit breakers that have current sensors. In one example, meter 810 provides sensor data to iGOS control 820, which can communicate to the power converters. The dashed lines represent the communication from iGOS control 820 to the power converters. The line from meter 810 to iGOS control 820 represents the current vector information that can be provided by the meter.

Node 830 represents a connection point of the power converters to meter 810. The power converters represent power converters to control the energy generation, and can provide reactive power injection. System 800 illustrates string 840 with power converters 842 and string 850 with power converters 852. Power converters 842 and power converters 852 can be the same, or at least comparable, to each other.

In one example, the power converters are in strings within the system. The strings can be in a string for purposes of communication with the iGOS control. In one example, the converters communicate among themselves to detect their neighbors and perform position detection. In one example, each converter has a unique identifier, such as a unique MAC address, and can therefore be uniquely identified. Power converters 842 can be connected in string 840 to facilitate communication with the power converter and understand the resources to which it is connected. Similarly, power converters 852 can be connected in separate string 850. Communication to a power converter can include a determination of its location based on its string and its location within the string.

In one example, power converters 842 and 852 know what string they belong to, and what string position they have in the string. Power converters 842 and 852 can know which phase or feed they are connected to. In one example, system 800 can control the export by feed. The load and reactive power needs can be different for different feeds. By knowing what converters are on what feeds, and on what string, the controller can instruct different converters to perform different operations.

Figure 9:
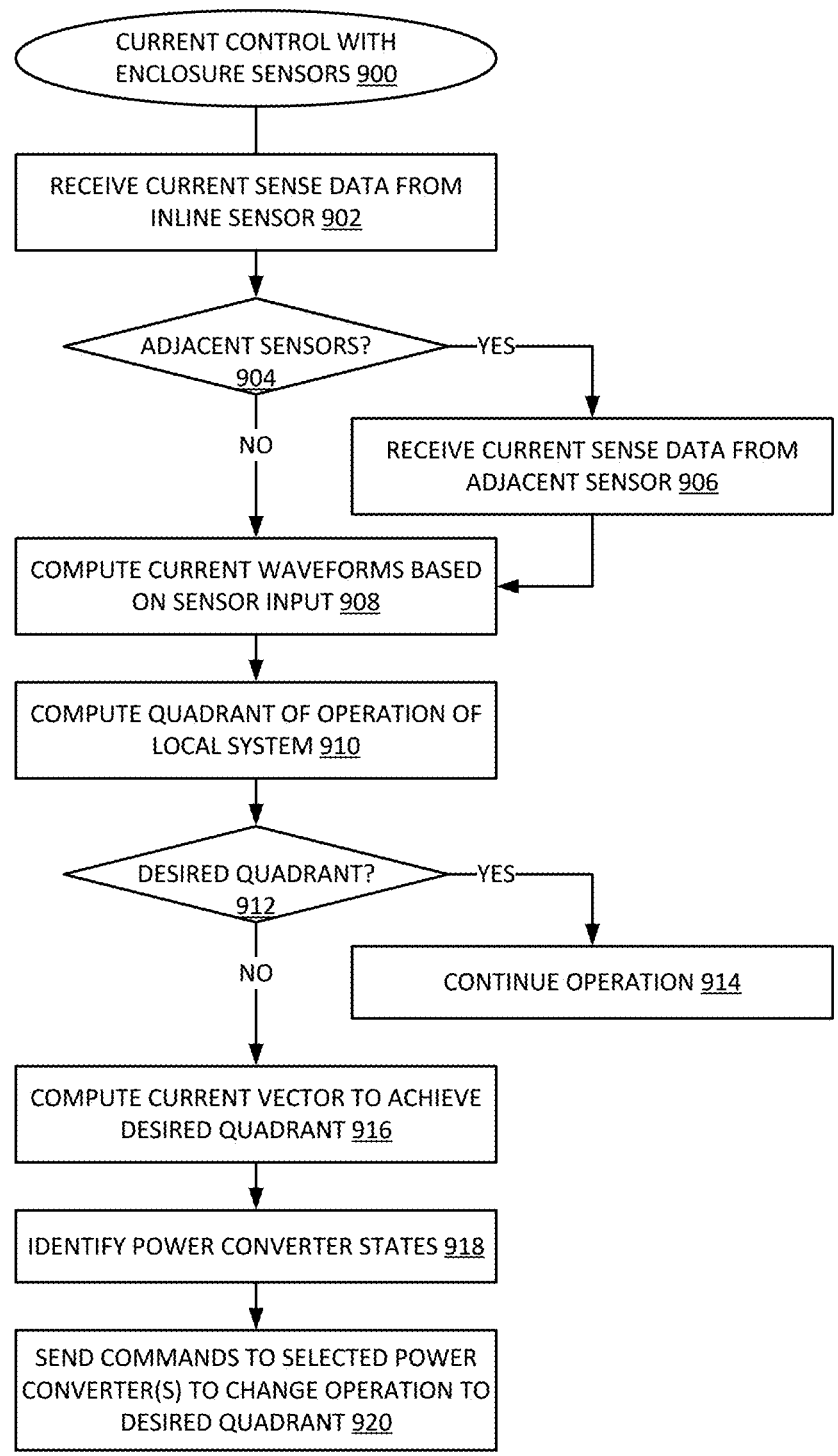
FIG. 9 is a flow diagram of an example of process for controlling current with an enclosure having current sensors.

FIG. 9 is a flow diagram of an example of process for controlling current with an enclosure having current sensors. Process 900 represents a process to control a response to current operations in an enclosure with current sensors. Process 900 can be executed by a controller or a gateway device as described herein.

A current sensor inline with the conductor of the enclosure generates current sense data. A controller receives the current sense data from the inline sensor, at 902. The sensor can be referred to as inline because it is along the path of the current, even though it is not part of the electrical circuit. In one example, the sensor represents a sensor I/C that generates an output voltage based on a current that passes under or over the I/C.

In one example, the current readings can be affected by adjacent circuits. The adjacent circuits can be monitored by additional sensors to monitor the current along the path of the adjacent electrical circuits. In one example, if there are adjacent sensors, at 904 YES branch, the controller can receive current sense data from the adjacent sensor or otherwise access the data, at 906. The controller can use the adjacent sensor data to adjust the readings for the sensor of the circuit of interest based on calibration data. Thus, the readings can reflect the actual current usage of the electrical circuit.

If there are not adjacent circuits to affect the readings or there are no adjacent sensors, at 904 NO branch, or after taking into account the adjacent sensors, at 906, the controller can compute current waveforms based on the sensor input, at 908. In one example, the controller performs vector calculations based on current vector representations of the current waveforms.

In one example, the controller computes a quadrant of operation of the local system, at 910. In one example, the controller does not need to compute the quadrant of operation because a current sensor can generate data to indicate a quadrant of operation. The controller can determine if current vector readings are in a desired quadrant. If the current vector for the local system is in a desired quadrant, at 912 YES branch, the system can simply continue operation, at 914.

If the current vector for the local system is not in a desired quadrant, at 912 NO branch, in one example, the controller computes a current vector to achieve the desired quadrant of operation, at 916. In one example, the computations are vector calculations as described herein. The controller can determine an adjustment that would be needed to real power or reactive power or a combination of real and reactive power to shift the local system vector into the desired quadrant. More specific than quadrant, in one example, based on the computations, the controller can determine a precise vector angle on a unit circle that will put the local system vector in a desired location to achieve a desired connection with the grid. The desired connection will present a reactive power offset wanted by the grid to put the local system in compliance with operating parameters of the grid.

In one example, the controller can identify the current state of one or more power converters, at 918, and adjust the operation of the power converter(s) to meet the target local system vector. In one example, the controller sends commands to selected power converter(s) to change their operation to cause the shift in local system current vector to the desired quadrant or specific location on the unit circle, at 920.

Figure 10:
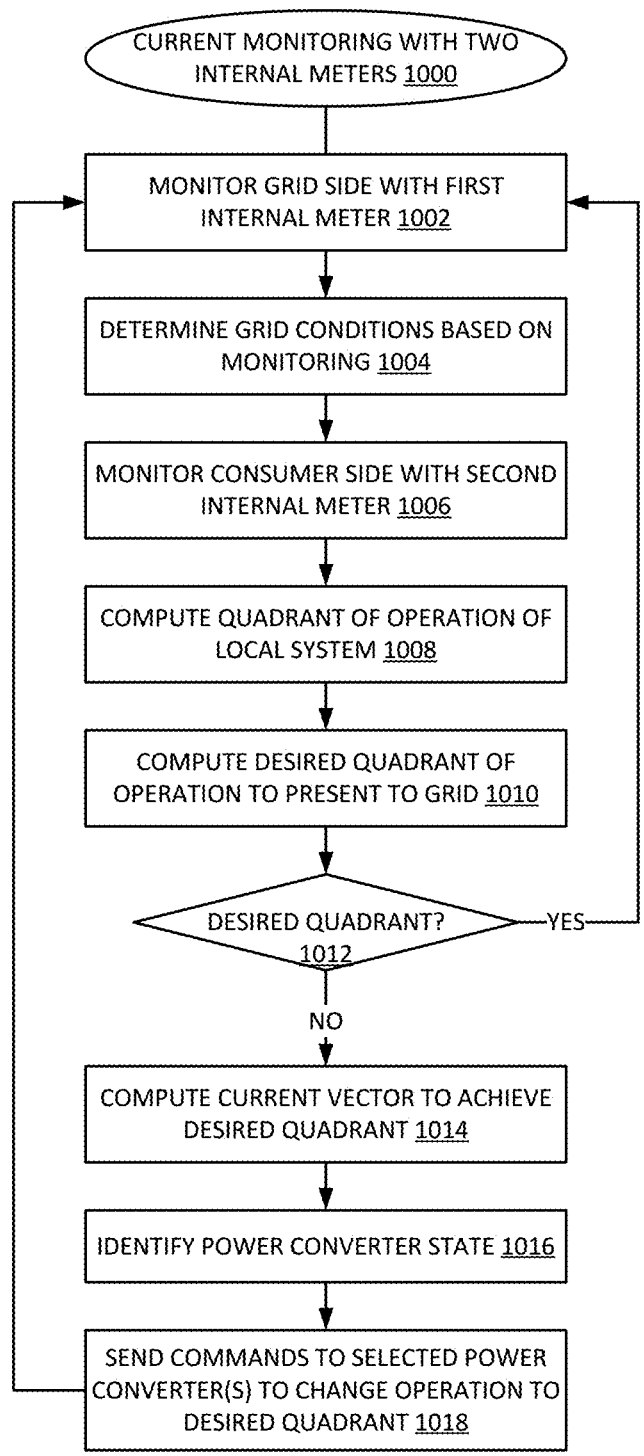
FIG. 10 is a flow diagram of an example of process for controlling current with a system having two internal meters.

FIG. 10 is a flow diagram of an example of process for controlling current with a system having two internal meters. Process 1000 represents a process to control a response to current operations in an enclosure with current sensors. Process 1000 can be executed by an enclosure and iGOS system as described herein.

An enclosure that includes power distribution hardware to a consumer premises includes a first internal meter or an internal sensor to monitor grid side conditions, at 1002. The system can determine grid conditions based on the monitoring, at 1004. In one example, the sensor or meter itself generates a representation of the conditions of the grid by generating a grid vector to represent the complex current vector as seen at the PCC. In one example, the sensor or meter sends the data to the controller that can determine the grid conditions from the data.

The enclosure includes a second internal meter or an internal sensor to monitor consumer side conditions, at 1006. As with grid side information, the system can determine consumer side conditions based on the monitoring, at 1008. In one example, the sensor or meter itself generates a representation of the conditions of the local system by generating a local vector to represent the complex current vector as seen looking into the local system. In one example, the sensor or meter sends the data to the controller that can determine the local conditions from the data.

In one example, the controller computes a quadrant of operation of the local system, at 1008. In one example, the controller does not need to compute the quadrant of operation because a current sensor can generate data to indicate a quadrant of operation. In one example, the controller computes a desired quadrant of operation or specific angle on the unit circle to present to the grid at the PCC, at 1010. Presenting different operational states to the grid refers to adjust the operations behind the meter so that at the PCC the grid sees what it wants to see, such as consumption within certain parameters of reactive power. The operation can be adjusted within the system itself in a way, for example, that reactive loads that grid management has requested curtailment can still be operated, but will disappear from the grid's point of view because the reactive power will not be drawn from the grid.

The controller can determine if current vector readings are in a desired quadrant. If the current vector for the local system is in a desired quadrant, at 1012 YES branch, the system can continue operation as normal, monitoring the grid and location conditions, starting at 1002.

If the current vector for the local system is not in a desired quadrant, at 1012 NO branch, in one example, the controller computes a current vector to achieve the desired quadrant of operation, at 1014. In one example, the computations are vector calculations as described herein. The controller can determine an adjustment that would be needed to real power or reactive power or a combination of real and reactive power to shift the local system vector into the desired quadrant. More specific than quadrant, in one example, based on the computations, the controller can determine a precise vector angle on a unit circle that will put the local system vector in a desired location to achieve a desired connection with the grid. The desired connection will present a reactive power offset wanted by the grid to put the local system in compliance with operating parameters of the grid.

In one example, the controller can identify the current state of one or more power converters, at 1016, and adjust the operation of the power converter(s) to meet the target local system vector. In one example, the controller sends commands to selected power converter(s) to change their operation to cause the shift in local system current vector to the desired quadrant or specific location on the unit circle, at 1018. The system can then continue to monitor operation, starting at 1002.

Figure 11:
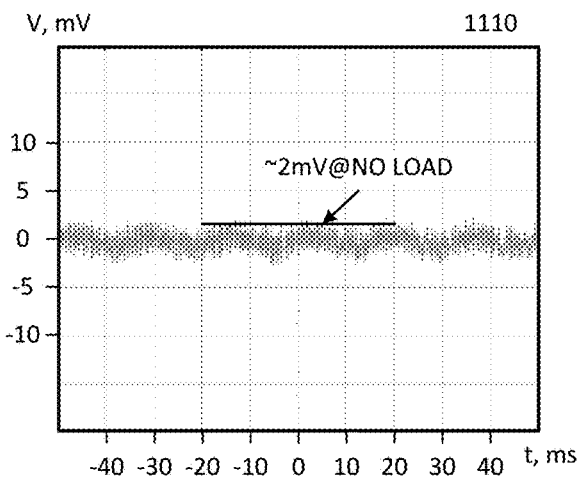
FIG. 11 is a representation of an example of voltage readings of sensors that are placed proximate a connection point of a circuit breaker to a board.
Figure 11:
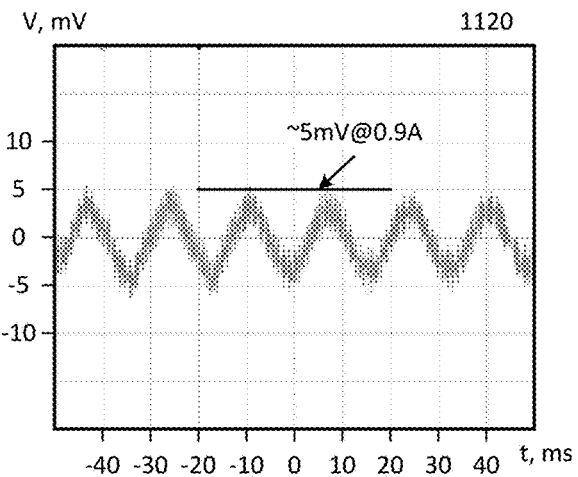
Figure 11:
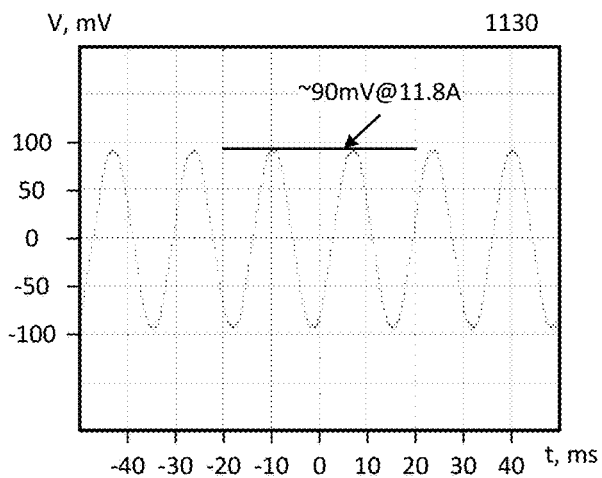

FIG. 11 is a representation of an example of voltage readings of sensors that are placed proximate a connection point of a circuit breaker to a board. Diagrams 1110, 1120, and 1130 illustrate voltage readings of sensors that are placed proximate a connection point of a circuit breaker to a board, such as examples described previously.

Diagram 1110 illustrates a minimal voltage reading when there is a no load condition. The no load condition refers to a condition when the sensor monitors a circuit that is not drawing power. The noise floor is shown to be approximately 2 mV with no load. Diagram 1120 illustrates a voltage waveform with a signal that swings to approximately +/−5 mV when 0.9 Amps are drawn by the monitored circuit. Diagram 1130 illustrates a voltage waveform with a signal that swings to approximately +/−90 mV when the circuit draws 11.8 Amps.

Such measurements can be used to calibrate the system. After calibration, measurements such as those illustrated can be used to determine the behavior of the system. As illustrated, the full waveform can be determined, which enables the system to determine phase of the current as well as amplitude. From such information the system controller can compute current vectors to use in vector computations to determine quadrants.

Figure 12:
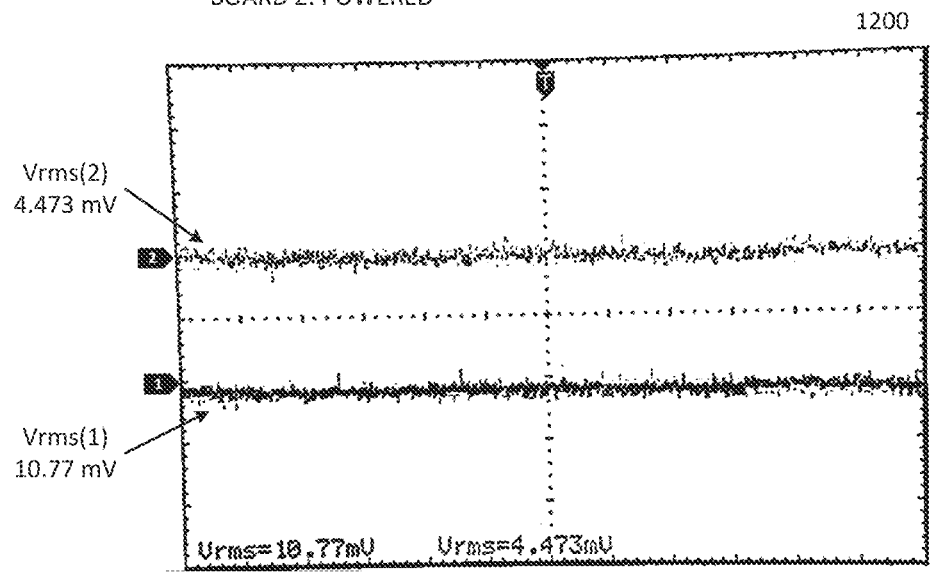
FIG. 12 is a representation of an example of voltage readings for a system having multiple sensors, where the monitored channels are not loaded.

FIG. 12 is a representation of an example of voltage readings for a system having multiple sensors, where the monitored channels are not loaded. Diagram 1200 illustrates an example where channel 1 and 2 are not loaded, which results in minimal readings. It will be observed that even without loading, the noise floors of the different sensors can be different, as channel 1 has a 10.77 mV noise floor and channel 2 has a 4.473 mV noise floor. Such differences can be accounted for future computations of current waveforms.

Figure 13:
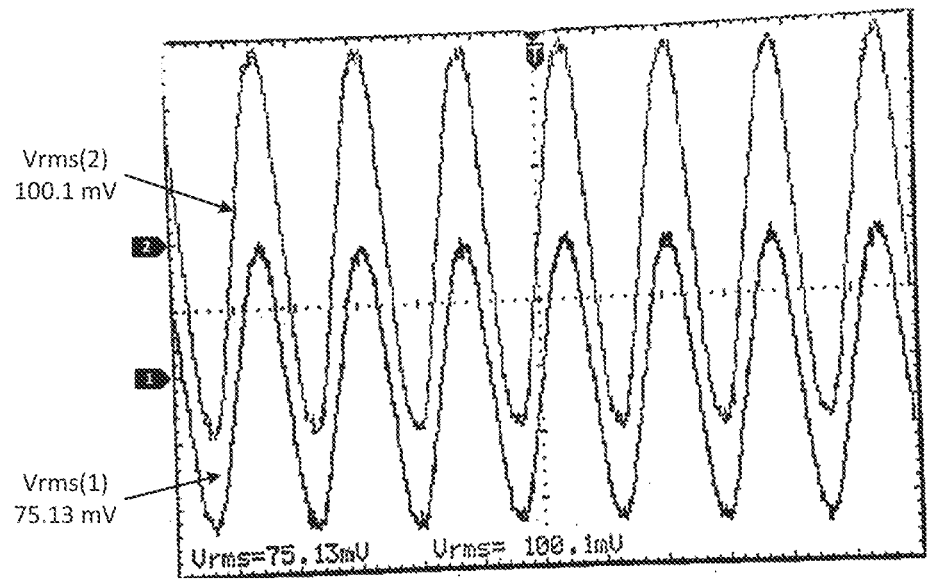
FIG. 13 is a representation of an example of voltage readings for a system having multiple sensors, where the monitored channels are both loaded.

FIG. 13 is a representation of an example of voltage readings for a system having multiple sensors, where the monitored channels are both loaded. Diagram 1300 illustrates an example where channel 1 and channel 2 are loaded. In one example, diagram 1300 illustrates equal loading on both channels, which results in different readings depending on the sensor monitored. For example, the sensor of channel 2 may be influenced by channel 1 more than the sensor for channel 1 is influenced by channel 2. Thus, channel 2 shows a reading of 100.1 mV while channel 1 shows a reading of 75.13 mV.

Figure 14:
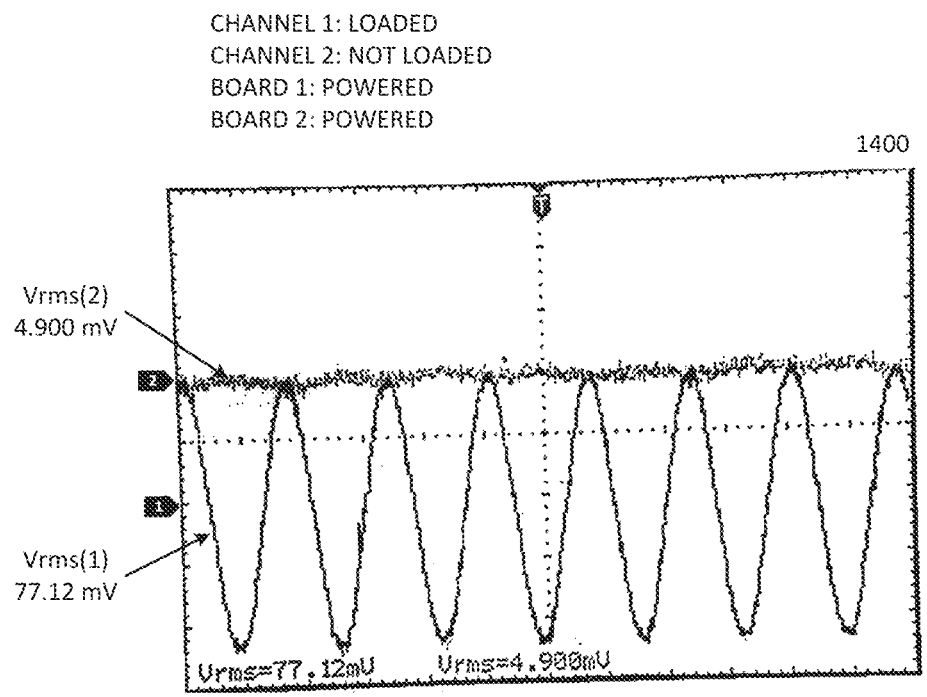
FIG. 14 is a representation of an example of voltage readings for a system having multiple sensors, where for the monitored channels, channel 1 is loaded and channel 2 is not loaded.

FIG. 14 is a representation of an example of voltage readings for a system having multiple sensors, where for the monitored channels, channel 1 is loaded and channel 2 is not loaded. Diagram 1400 illustrates an example where channel 1 is loaded and channel 2 is not loaded. Channel 1 shows a waveform of 77.12 mV, which is comparable to the waveform of diagram 1300. Channel 2 shows a waveform of 4.900 mV, which is comparable to diagram 1200.

Figure 15:
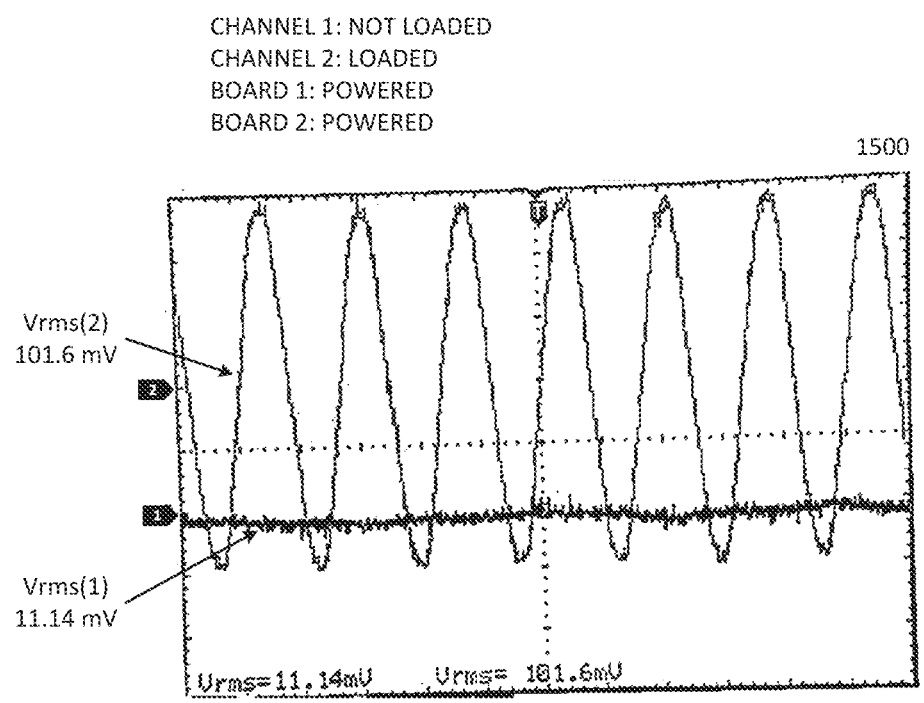
FIG. 15 is a representation of an example of voltage readings for a system having multiple sensors, where for the monitored channels, channel 1 is not loaded and channel 2 is loaded.

FIG. 15 is a representation of an example of voltage readings for a system having multiple sensors, where for the monitored channels, channel 1 is not loaded and channel 2 is loaded. Diagram 1500 illustrates an example where channel 2 is loaded and channel 1 is not loaded. Channel 2 shows a waveform of 101.6 mV, which is comparable to the waveform of diagram 1300. Channel 1 shows a waveform of 11.14 mV, which is comparable to diagram 1200.

Figure 16:
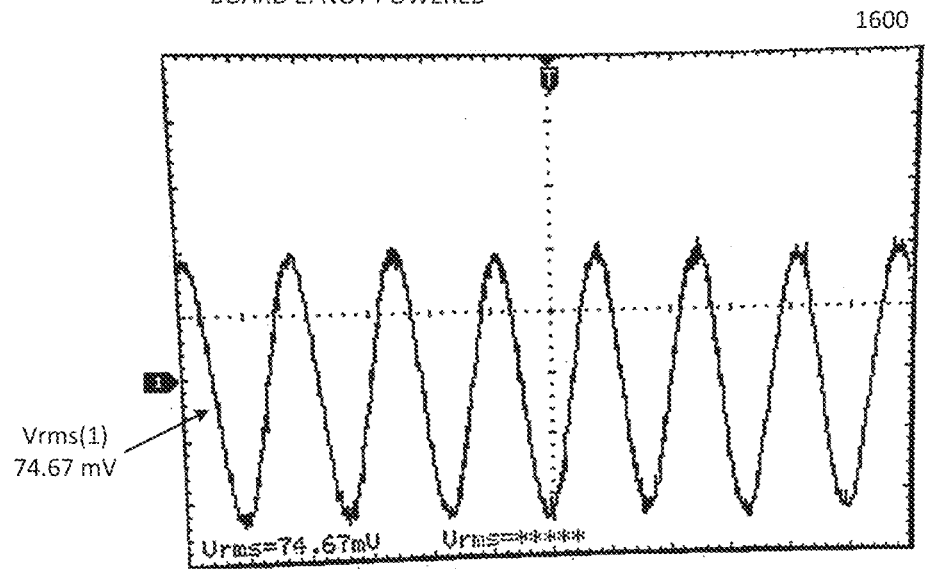
FIG. 16 is a representation of an example of voltage readings for a system having multiple sensors, where for the monitored channels, channel 1 is loaded and channel 2 is not loaded and channel 2 is not powered.

FIG. 16 is a representation of an example of voltage readings for a system having multiple sensors, where for the monitored channels, channel 1 is loaded and channel 2 is not loaded and channel 2 is not powered. Diagram 1600 illustrates an example where channel 1 is loaded and channel 2 is not loaded. The sensor for channel 1 (Board 1) is powered and the sensor for channel 2 (Board 2) is not powered. In such an example, there is no reading for channel 2, and the reading for channel 1 is 74.67 mV, comparable to previous readings.

Figure 17:
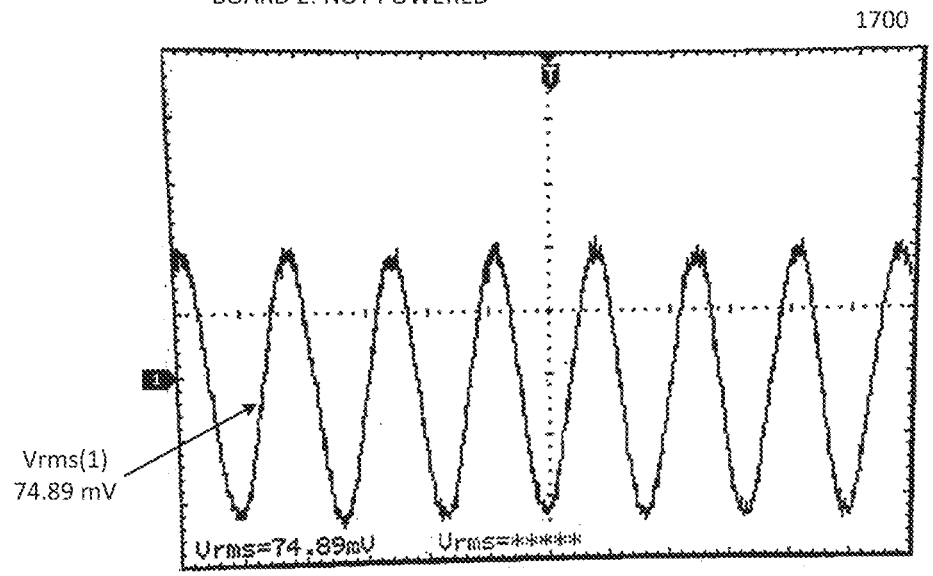
FIG. 17 is a representation of an example of voltage readings for a system having multiple sensors, where both monitored channels are loaded and channel 2 is not powered.

FIG. 17 is a representation of an example of voltage readings for a system having multiple sensors, where both monitored channels are loaded and channel 2 is not powered. Diagram 1700 illustrates an example where both channel 1 and channel 2 are loaded. Again the sensor for channel 1 (Board 1) is powered and the sensor for channel 2 (Board 2) is not powered. In such an example, there is no reading for channel 2, and the reading for channel 1 is 74.89 mV, comparable to previous readings. The readings, though comparable, may show differences that could be accounted for in computing current vector information. Each system can have a different noise tolerance to determine how much the readings should be adjusted.

Figure 18:
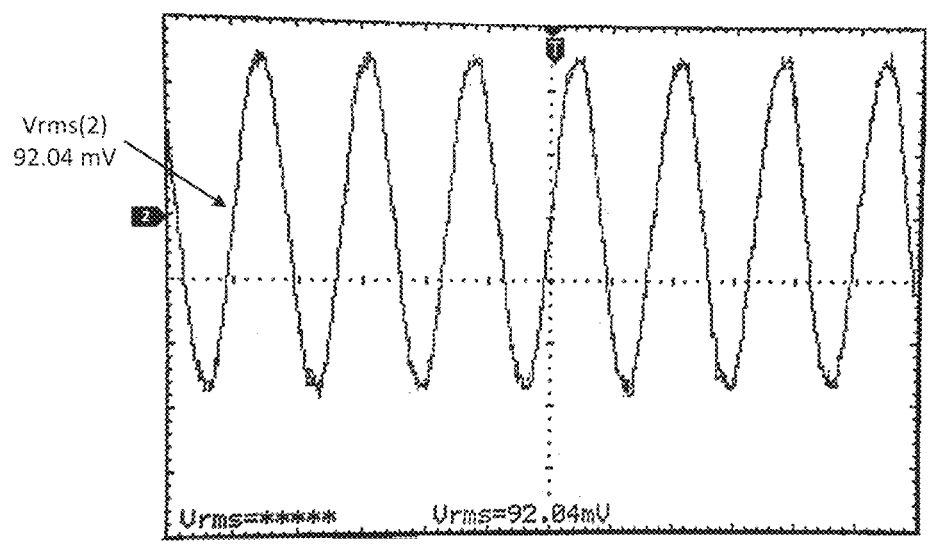
FIG. 18 is a representation of an example of voltage readings for a system having multiple sensors, where for the monitored channels, channel 1 is not loaded and channel 2 is loaded and channel 1 is not powered.

FIG. 18 is a representation of an example of voltage readings for a system having multiple sensors, where for the monitored channels, channel 1 is not loaded and channel 2 is loaded and channel 1 is not powered. Diagram 1800 illustrates an example where channel 1 is not loaded and channel 2 is loaded. The sensor for channel 1 (Board 1) is not powered and the sensor for channel 2 (Board 2) is powered. In such an example, there is no reading for channel 1, and the reading for channel 2 is 92.04 mV. It will be observed that the reading for channel 2 is lower than previous readings, which may indicate noise differences due to different loading conditions.

Figure 19:
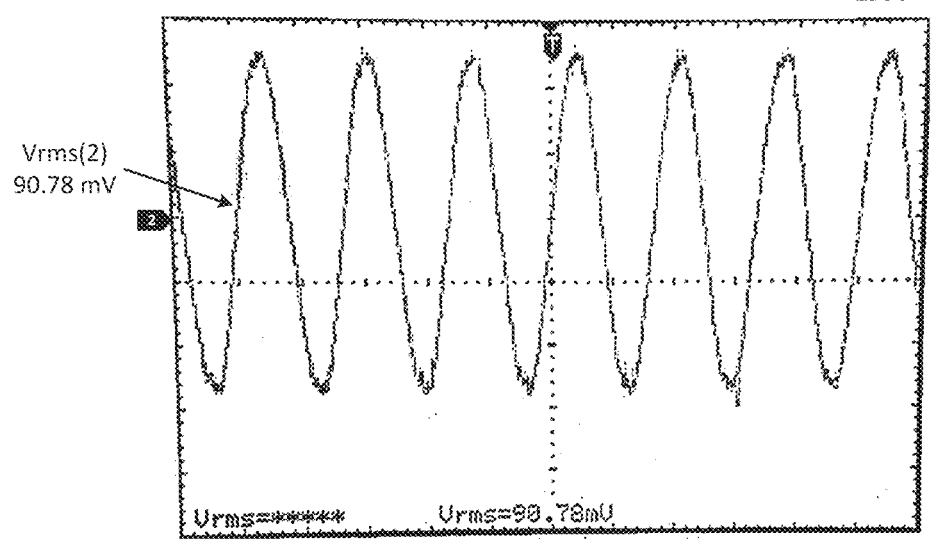
FIG. 19 is a representation of an example of voltage readings for a system having multiple sensors, where both monitored channels are loaded and channel 1 is not powered.

FIG. 19 is a representation of an example of voltage readings for a system having multiple sensors, where both monitored channels are loaded and channel 1 is not powered. Diagram 1900 illustrates an example where both channel 1 and channel 2 are loaded. Again the sensor for channel 1 (Board 1) is not powered and the sensor for channel 2 (Board 2) is powered. In such an example, there is no reading for channel 1, and the reading for channel 2 is 90.78 mV, also lower than previous readings. Multiple such readings can be made to perform calibration to determine how to interpret sensor readings.

Figure 20:
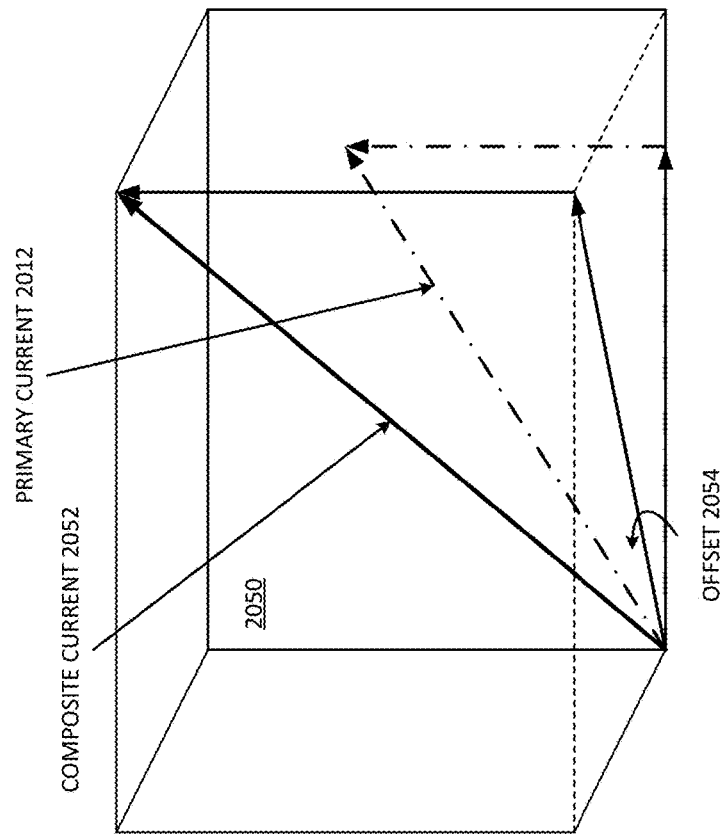
FIG. 20 is a graphical representation of an example of components of a current in a system in which a current vector is a composite of a primary current component and harmonic current components.
Figure 20:
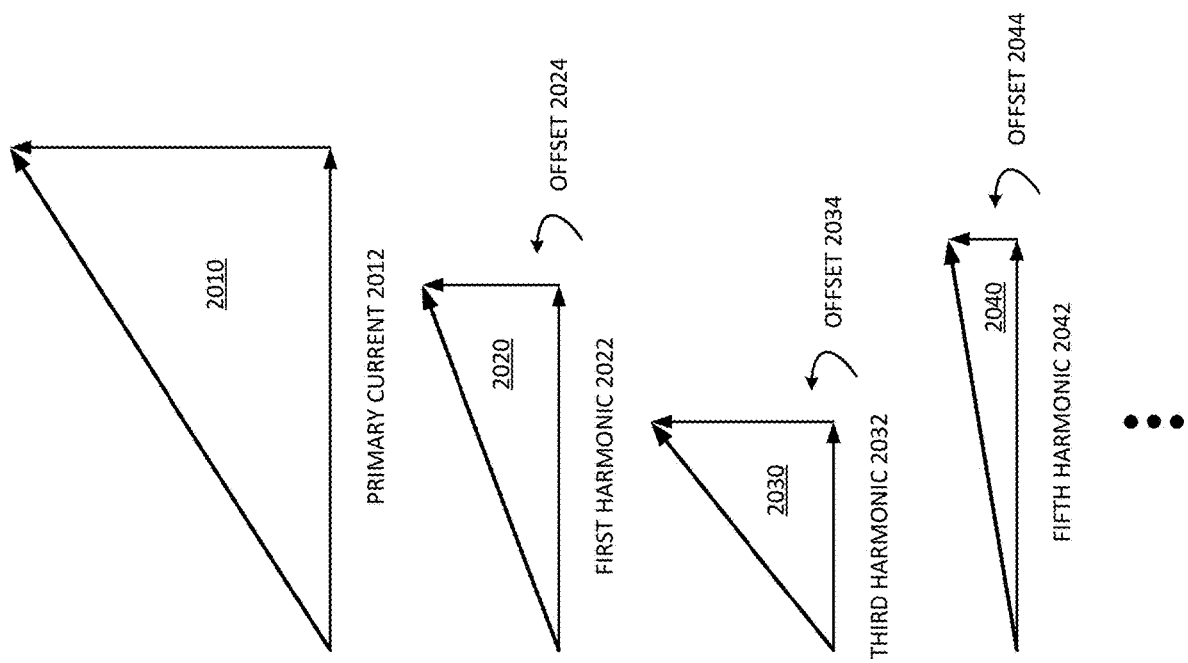

FIG. 20 is a graphical representation of an example of components of a current in a system in which a current vector is a composite of a primary current component and harmonic current components. Diagrams 2010, 2020, 2030, and 2040 illustrate component parts of a complex current vector as can be computed and used in accordance with system 100 or system 600. As illustrated, diagram 2010 represents the primary current vector 2012. The primary current includes x and y components, and defines a reference frame for the harmonics.

Diagram 2020 represents first harmonic vector 2022, which includes x and y components and angular offset 2024. Diagram 2030 represents third harmonic vector 2032, which includes x and y components and angular offset 2034. Diagram 2040 represents fifth harmonic vector 2042, which includes x and y components and angular offset 2044. Each of the primary current 2012 and various harmonics (2022, 2032, 2042) are shown as two-dimensional "power triangle" representations, which is what is traditionally expected for each one. However, the harmonics are frequently at an angular offset with respect to the primary current component vector, and thus the resulting composite current vector may not be in the same plane as primary current vector 2012.

Rather, consider the power triangle of the composite current vector as a triangle in a three dimensional box. Diagram 2050 provides a simple illustration of this concept. It will be observed that primary current vector 2012 is on a face of the three dimensional box of diagram 2050. The harmonics push the triangle for the composite current "into" the box in some way. Composite current vector 2052 is both larger in magnitude, and offset angularly with respect to primary current vector 2012. Offset 2054 represents the angular offset. It will be understood that primary current vector 2012 and composite current vector 2052 define the "shape" of the box. Depending on the amount of harmonic contribution, the box shape will be different. The composite current vector 2052 can be a signature stored by the metering device. The reference plane of primary current 2012 can be defined as a plane of the grid power (referring to the power condition as seen at the grid via the PCC.

With respect to the noise and harmonics generated, it will be understood that there are regulations on switching power supplies and magnetic resonance in general. Each device is tested for compliance (e.g., UL certification). When each device or load works individually as designed and tested, each one will comply as required per regulations. However, when there are multiple loads and/or devices coupled together, they tend to create unanticipated resonance. The inventors have measured contributions to the energy triangle from the first up to the 40th harmonic. Thus, there is typically a significant amount of harmonic noise happening on the power lines. Harmonic suppression traditionally includes filters that target specific noise components. However, the noise components can continue to vary as different devices come online and offline, and the electrical resonance structure of the network continually changes. In one example, a meter detects the characteristics of each load or group of loads. The characteristics can be referred to as a signature of the harmonics.

In one example, the power meter or energy meter can detect such shifts as the angular offsets of the harmonic current vectors, by measuring energy contributions. The power converter can compensate for the actual composite current by providing the reactive power needed to match the load and/or PCC to the grid. Thus, the current at the load can be adjusted by the converter to bring the composite current into alignment with the grid, not simply in power factor, but in complex vector. Such operation will naturally eliminate or at least reduce harmonic distortion caused by loading on the grid.

In one example, what is described in reference to loading can also be performed with reference to energy generation. In one example, the meter can determine an energy signature at the PCC and compute what current would be needed to offset the grid to a desired offset (if some power factor other than unity is desired) and/or to match to the grid in a case where unity power factor is desired. The converter can adjust operation to adjust the power output to not only match reactive power needs, but complex current vector shift as well to more efficiently match the interface of the grid with the downstream from the PCC.

It will be understood that the energy triangle represented in diagram 2050 can be represented as a mathematical representation of the effect seen when looking at the current component of power drawn by a load or consumer. The effect is wasted energy, which usually manifests itself as heat. The problem traditionally is that systems do not match well, and there are significant noise components. In one example, a control node matches not just impedance, but matches noise or harmonic correction to provide a specific energy signature connection to the grid. Thus, the control node can provide a "cleaner" connection to the grid network with respect to the power interface, whether outputting power onto the grid or receiving power from the grid.

Figure 21:
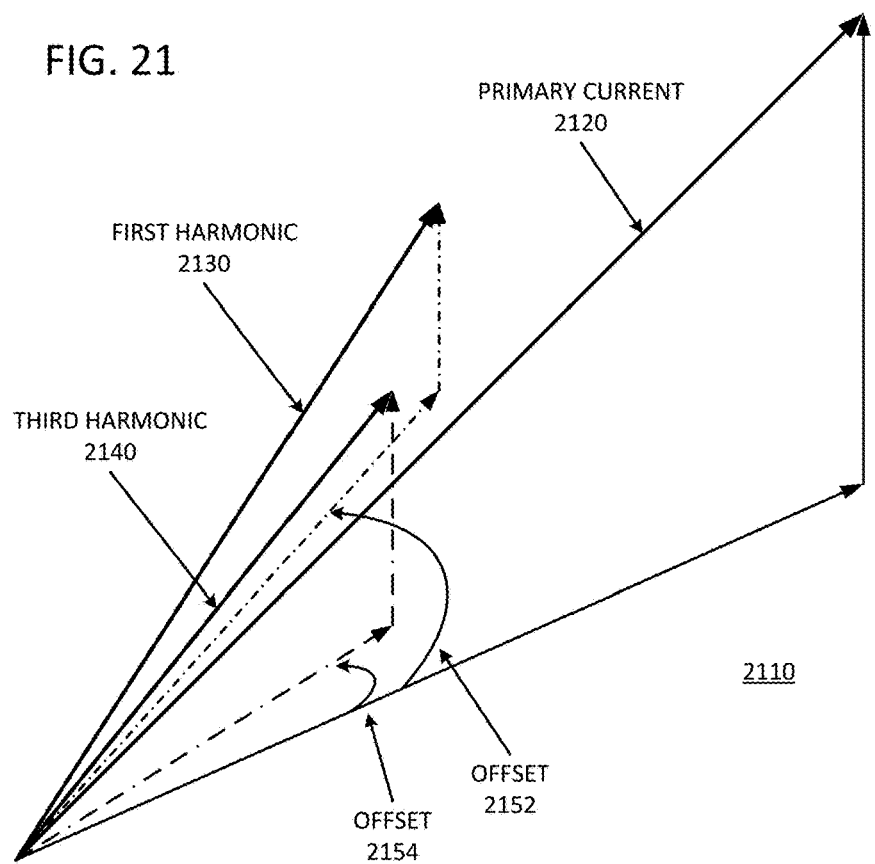
FIG. 21 is a graphical representation of an example of components of a current in a system in which harmonic components of current have angular offsets with respect to a primary current component.

FIG. 21 is a graphical representation of an example of components of a current in a system in which harmonic components of current have angular offsets with respect to a primary current component.

Diagram 2110 provides a complex vector representation of current. A vector has a magnitude and a direction. Instead of simply measuring power as traditionally done, in one example, a meter (such as a meter in accordance with meter 762) can monitor power as an energy signature including a representation of a complex power vector. In one example, each signature identifies characteristics to define the signature. Each signature includes a complex vector representation that provides a vector for primary current and a vector for one or more harmonics.

Vector 2120 is the vector for primary current. In typical representation, the x-coordinate is the vector component that extends from left to right across the page. The y-component goes from bottom to top of the page. It will be understood that while not represented here for purposes of simplicity, a vector could have a negative y-component. The x-y coordinates define the end of the vector. Now assume that the x and y coordinates of primary current vector 2120 define a plane. The most correct way to envision the harmonics, in accordance with research and work done by the inventors, is to represent the harmonics as a three-dimensional vector. Thus, if the x-y coordinates of vector 2120 define a reference plane, one or more of the harmonics can have an angular offset relative to the plane of the primary current vector.

For example, consider the example of diagram 2110. The first harmonic is illustrated as having vector 2130, which includes an x component and a y component, where the magnitudes of the components can be any magnitude with respect to the primary current components. In addition to the x and y coordinates, first harmonic vector 2130 includes a z coordinate component, which defines angular offset 2152 of the current vector with respect to the reference plane of primary current vector 2120. It will be understood that the starting points of the primary current and the harmonics are the same. Thus, the third dimension of the harmonic vectors or the complex vectors is not necessarily an absolute z coordinate component, but an angular offset relative to the primary current.

As illustrated, third harmonic vector 2140 also has an x component and a y component, and angular offset 2154, which can be different (greater or less than) angular offset 2152 of first harmonic vector 2130. The angular shift of the angular offsets represents a magnetic effect on the current. The inventors have measured noticeable effects on power consumption up to the fortieth harmonic. Thus, the contribution of harmonic offsets should not be understated. The harmonics shift with respect to the angular offset due to the differing resonant effects of magnetic flux when trying to move a current. Primary current vector 2120 is the current the consumer expects to see. However, the harmonic components can add significant (measurable) power consumption. The offsets of the harmonics can shift the simple expected two-dimensional current vector into a three-dimensional current vector (complex current vector). The traditional power triangle does not fully address the power usage by the consumer, as additional power will be required to overcome the magnetic components represented by the shifted or offset harmonic components.

In one example, a controller or a gateway system makes current computations based on representations of currents in vector form in accordance with diagram 2110. In one example, a meter in accordance with meter 762 generates a vector representation of current for a monitored node and provides the data to a controller. The controller can not only identify signatures for different loads or different electrical circuits, but can identify a comparison of the grid current vector with the local current vector. The controller can send a request to a power converter to adjust operation of an output to shift the local current vector to a desired state based on where the grid vector is located on a 4 quadrant unit circle.

Figure 22:
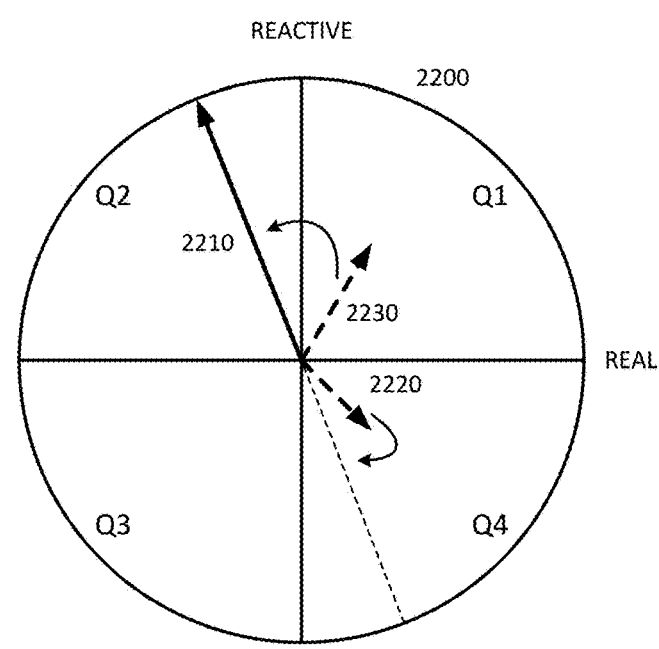
FIG. 22 is a graphical representation of an example of a grid current vector mapped against a local system current vector.

FIG. 22 is a graphical representation of an example of a grid current vector mapped against a local system current vector. Circle 2200 provides a representation of a current vector. In one example, circle 2200 illustrates diagrammatic information generated by a controller to map grid vector 2210 onto circle 2200.

In one example, the grid vector is obtained by measuring the grid current at the PCC. In one example, the grid vector is the reference vector, and thus circle 2200 can be normalized to the magnitude of vector 2210. Circle 2200 could be normalized to a different unit, such as the peak power of the consumer premises or the peak output capability of the consumer premises, where, for example, vector 2210 could represent the consumption of the consumer premises as seen at the PCC.

Circle 2200 includes two different local vectors for purposes of discussion, vector 2220 and vector 2230. In one example, a consumer premises will have only one local vector. In one example, a consumer premises includes multiple vectors based on different phases or different feeds supplied to the consumer premises.

Vector 2220 can represent where the current generation of the consumer system is at the time of measurement. In one example, the iGOS wants to shift vector 2220 to the dashed line to counteract vector 2210. Such a case could be true where vector 2210 represents consumption and vector 2220 represents generation. In another representation, the system could want to shift vector 2220 from quadrant 4 (Q4) to quadrant 2 (Q2) to align with vector 2210, if for example, the representation illustrates vectors that should be aligned for maximum efficiency. In one example, the consumer premises could have current vector 2230 in quadrant 1, which the system may want to shift to a different quadrant, such as inline with vector 2210 in quadrant 2.

It will be understood that different representations can be made of the grid vector and local vector or local vectors. The alignment or offset of those vectors can be different depending on different operation. For example, perhaps the system wants to move a local vector intentionally out of phase with the grid vector to ensure that the system provides reactive power support. Whatever the representation or the desired quadrant (which could be even more specific to a specific angle on circle 2200 within a desired quadrant), it will be understood that understanding the magnitude and angle of the vectors can allow the system to determine whether power converters should convert real power to reactive power, to adjust a mix of real and reactive power for the system, or otherwise how to shift operation.

In one example, as represented in circle 2200, a controller can make computations to determine the operations of the power converters by performing vector computations. Thus, the system can represent measured current waveforms in vector form, and perform vector computations to determine how to adjust the operation of the system to achieve the desired result. The system can compute vector calculations to determine a mix of real and reactive power needed, or to determine the mix of real and reactive power a power converter should output to shift operation of the system.

Figure 23:
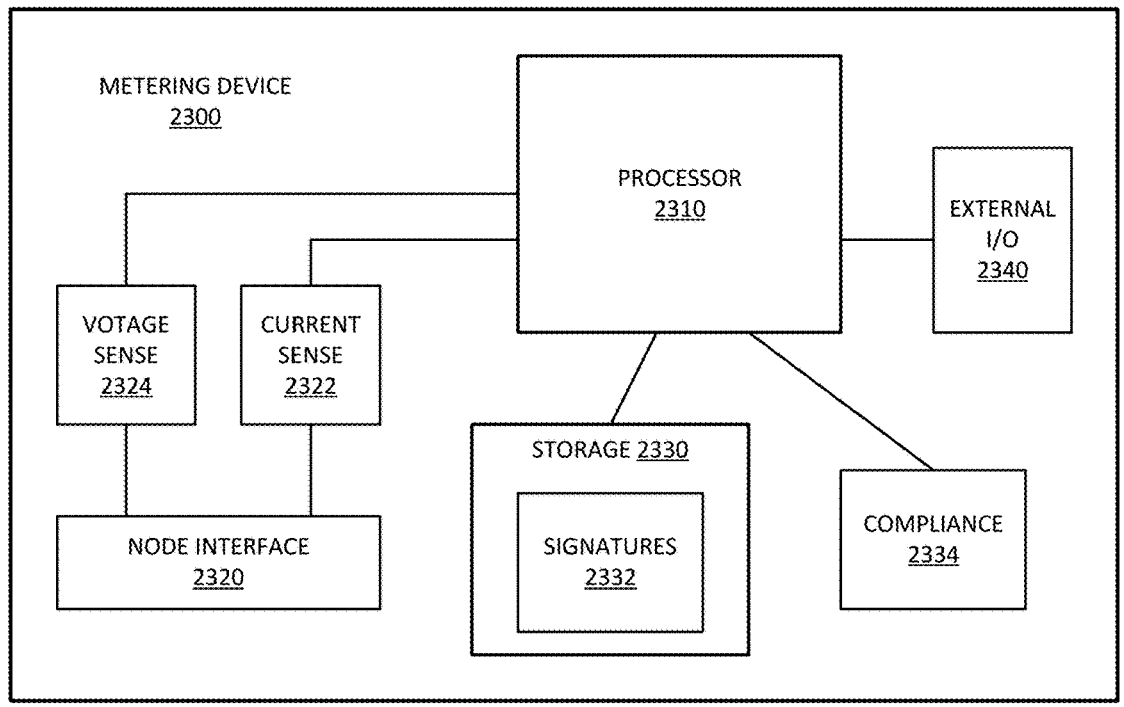
FIG. 23 is a block diagram of an example of a metering device that monitors power at a PCC.

FIG. 23 is a block diagram of an example of a metering device that monitors power at a PCC. Metering device 2300 can be an internal meter or internal sensor in accordance with any example herein. In one example, metering device 2300 is a sensor in an enclosure, such as in accordance with system 100 or system 600.

Metering device 2300 includes hardware components to interconnect to a management system, such as a gateway device or other iGOS system. In one example, metering device 2300 includes node interface 2320, which represents hardware to enable metering device to measure or monitor the energy usage or production or both energy use and energy production of electrical circuits. In one example, metering device 2300 includes voltage sense hardware 2324 and current sense hardware 2322. Current sense hardware 2322 can measure current drawn at a monitored node or energy supplied into the node, and can include hardware capable to measure harmonic components of the measured power. Current sense 2322 can include magnitude, phase offset (e.g., power factor), frequency, or other electrical properties of a current waveform at the monitored node. In one example, metering device 2300 can generate energy signatures and compare such energy signature computations to stored energy signatures 2332. Metering device 2300 can also store new energy signatures computed as signatures 2332. Voltage sense hardware 2324 can measure a voltage including phase, frequency, magnitude, or other electrical property of the voltage waveform at the monitored node.

Processor 2310 represents control logic or a controller for metering device 2300. Processor 2310 can be configured or programmed to perform the energy monitoring. Processor 2310 can be configured to perform computations to compute energy signatures, generate complex current vectors, or compare current and voltage readings to energy signatures or other current vectors. In one example, processor 2310 determines how current can be adjusted to compensate for harmonics, a grid condition, or other condition to cause a monitored node to be at a desired current vector location on a unit circle.

Metering device 2300 includes external I/O 2340 to enable metering device 2300 to connect to other metering devices, or to connect to a management system of a consumer premises where metering device 2300 is implemented. In one example, external I/O 2340 enables metering device 2300 to send data to a gateway device.

In one example, metering device 2300 includes storage resources, such as memory or hard drives or solid state storage, represented as storage 2330. In one example, metering device 2300 stores signatures or vectors for local use by the metering device or as data to send to an external controller. The signatures or vectors are represented in metering device 2300 as signatures 2332, which can simply represent waveform data for a monitored node. The waveform data can include data that represents or that can be used to calculate a complex current vector representing a condition of a current waveform at the monitored node.

In one example, processor 2310 accesses one or more items of compliance information 2334. In one example, compliance information 2334 is stored in storage 2330. In one example, compliance information 2334 is received via external I/O 2340. In one example, processor 2310 computes a current waveform phase and shape desired for a given power demand scenario or power generation scenario based on compliance information 2334. Thus, compliance information 2334 can affect how metering device 2300 operates. In one example, external I/O 2340 enables metering device 2300 to couple to an associated converter or converters. Based on calculations made by processor 2310, in one example, metering device 2300 can signal a power converter how to operate to achieve the desired current. In one example, metering device 2300 simply indicates the desired current to the power converter, which can then separately compute how to generate the current. In one example, metering device 2300 computes specific parameters as input to a power converter device to cause it to adjust its operation for the desired current vector.

Figure 24:
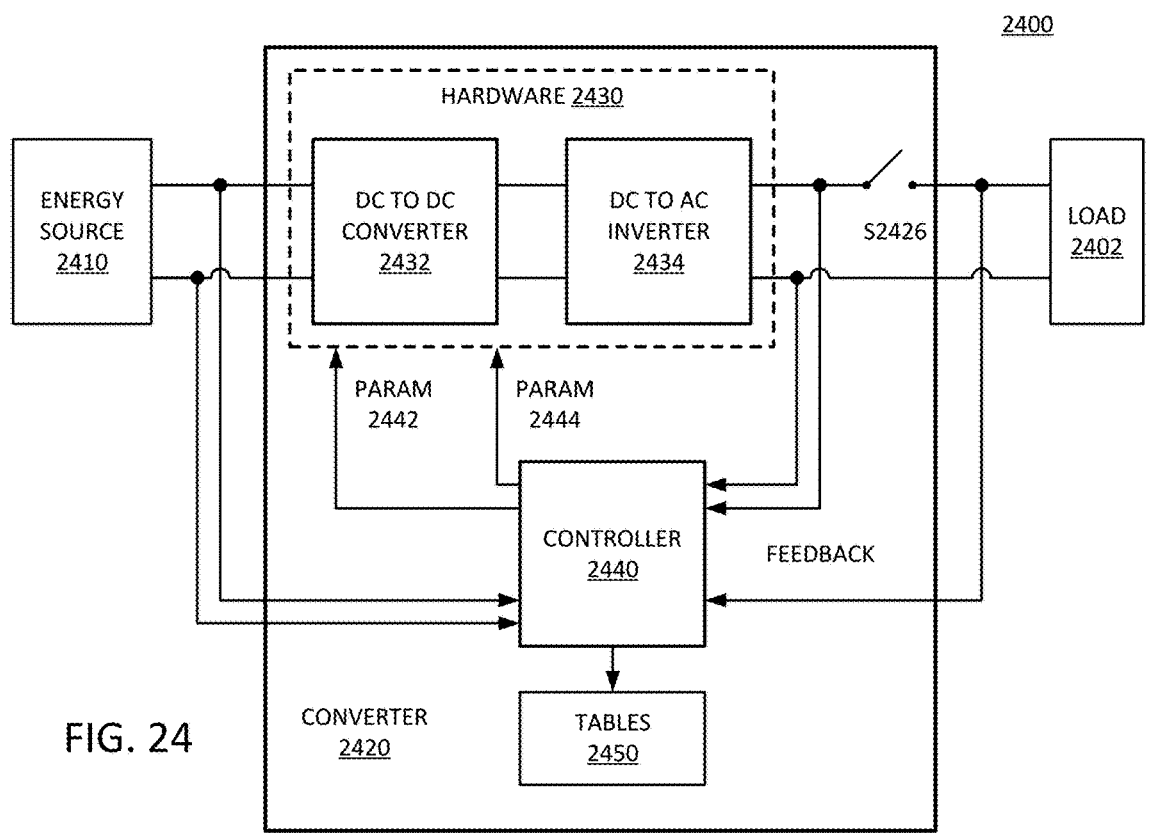
FIG. 24 is a block diagram of an example of a system that transfers power from a local source to a grid-tied load with reactive power injection.

FIG. 24 is a block diagram of an example of a power converter capable of reactive power injection. System 2400 illustrates power converter 2420 that couples an input to an output. Power converter 2420 can be a power converter in accordance with any description herein.

Fundamentally, power converter 2420 has electrical isolation between the output and the input. The electrical isolation enables power converter 2420 to perform impedance matching at the input with a source while also performing impedance matching at the output with a load. The impedance matching at both input and output can be accomplished through an internal node that isolates the input to allow the power converter to simply match whatever input the source is capable of providing, and to float the output to any voltage of the load.

System 2400 includes energy source 2410, which represents any DC (direct current) source of power. Energy source 2410 can be any example of energy generation, such as solar cells/array, wind power generator, or other time-varying or green power source. Energy source 2410 couples to hardware 2430 which electrically isolates the source from the output.

Hardware 2430 includes DC/DC converter 2432 to convert the DC input to an isolated DC source. Hardware 2430 includes DC/AC inverter 2424 to convert the isolated DC power into an alternating current (AC) to provide as the output. DC/AC inverter 2424 can generate the output with any desired phase as described below.

DC-to-DC (or DC/DC) converter 2422 which electrically isolates the source from the output. DC/DC converter 2422 has a dashed line to illustrate an internal node that can float on either side to match the electrical connection. For example, DC/DC converter 2422 can have an input transformer coupled to a separate output transformer, with the induced lines of the transformers coupled to each other on the internal node. The internal node can then simply float to whatever voltage is needed to pass current between the transformers. The input transform isolates the input and the output transformer isolates the output.

The input and output are internally isolated from each other by the floating node, which is charged with magnetic flux by high frequency switching of the input DC voltage. Thus, the internal node can simply float and receive any energy provided by the source, and deliver all available energy to the output at whatever voltage the output operates. The output will simply float to the load voltage and deliver current.

Hardware 2430 can impedance match by changing operation of the input interface of DC/DC converter 2432 to maximize energy transfer from source 2410 without fixing the voltage or current of the input to specific values. Rather, the input can allow the power to float to whatever voltage is produced by source 2410, and the current will match based on whatever total power is produced. Similarly, on the output, hardware 2430 impedance matches by changing operation of the output interface of DC/AC inverter 2434 to the load to allow the load to draw whatever power is needed at whatever voltage the load operates at. Thus, the output of hardware 2430 can float to match the voltage of the load (e.g., load 2402), and generate current to match the total power available.

Hardware 2430 can generate an output current waveform for DC/AC inverter 2434, where the magnitude is determined by how much energy is available, and whatever the load is at. Thus, the output floats to match the load, and is not fixed at a specific current or a specific voltage. The internal node between DC/DC converter 2432 and DC/AC inverter 2434 can act as an energy reservoir, where the input impedance matching enables the efficient charging of the internal node, and the output impedance matching enables the load to draw energy from the internal node.

Controller 2440 represents control hardware or a CPU (central processing unit) or processor of power converter 2420. Parameters (param) 2442 can control the input operation and parameters (param) 2444 can control the output operation. The input and output operations can both be controlled by switching device having a configured duty cycle to control the access to the energy of the internal node. In one example, controller 2440 receives input characteristic information from energy source 2410 to set parameters 2442 and 2444.

In one example, power converter 2420 includes tables 2450, which provide a table-based mechanism for generating an output current, which can provide an idealized output current instead of simply trying to generate a current based on the grid voltage, as is typically done. The idealized waveform of tables 2450 enables the output hardware to generate an ideally-shaped waveform without harmonic distortion, and which can be generated at any desired phase offset relative to the grid voltage. Thus, the idealized waveform enables power converter 2420 to output power electrically isolated from the input, and at any phase angle relative to the system connected to. As such, power converter 2420 can actually generate reactive power, instead of simply provide reactive loading to change the power factor. As such, power converter 2420 operates as a virtual spinning generator, which can generate an output current at any desired phase relative to a grid voltage.

Tables 2450 may include entries that are obtained based on input conditions measured from the system, to achieve a desired mix of real and reactive power. Feedback from the output can include voltage zero crossing, voltage amplitude, and current waveform information. With such information, controller 2440 can use tables 2450 to adjust the operation of DC/DC converter 2432 or DC/AC inverter 2434, or the operation of both. The tables may include setpoints that provide idealized output signals the system attempts to create. By matching output performance to an idealized representation of the input power, better system performance is possible than simply attempting to filter and adjust the output as traditionally done.

Controller 2440 can monitor the AC current, which moves out of DC/AC inverter 2434, and the target voltage of the load, such as load 2402 or a power grid (not specifically shown). Controller 2440 controls at least one electrical parameter of the interfaces of hardware 2430 to control its operation. Parameters 2442 and 2444 represent control from controller 2440 to control the operation of hardware 2430 within converter 2420. In one example, parameters 2442 can include a duty cycle of a switching signal of the power extraction for DC/DC converter 2432, which changes input impedance matching, which in turn controls the charging of the internal node. In one example, parameter 2444 can represent a duty cycle or other control signal to change an operation of DC/AC inverter 2434, which changes the output impedance matching, which in turns controls the outflow of energy from the internal node. The modification of each parameter can be dependent on the quality of the monitored current and voltage. Controller 2440 further controls switching device S2426 to couple the load to power produced by power converter 2420, when suitably conditioned power is available for use by load 2402.

Power converter 2420 includes switching device S2426 (e.g., a relay) to selectively connect hardware 2430 to load 2402. When power converter 2420 is grid-tied, the output can also connect to the grid through S2426. Under normal operation, DC power is drawn from source 2410, and extracted, inverted, and dynamically treated by power converter 2420, to dynamically produce maximum AC current relatively free of harmonic distortion and variability, and at a desired phase with respect an AC voltage signal from the grid or from load 2402.

In one example, power converter 2420 can generate AC current intentionally out of phase to a certain extent with respect to the AC voltage signal of the grid. Thus, the single power converter 2420 can generate reactive power to deliver power at any desired phase offset to satisfy load 2402 or to compensate for conditions on the power grid. In one example, multiple power converters 2420 can operate in parallel at the same interface. When coupled to the same interface, they can still independently operate to output power at an specified phase for each output to generate any ratio of real and reactive power from each one, or from the group.

In one example, system 2400 can be applied without a specific energy source 2410. For example, power converter 2420 can be coupled to receive power from the grid and generate an output to load 2402 that provides whatever mix of real and reactive power is needed by load 2402. In such an example, the power converter could be operated in reverse by connecting to the grid as a source for DC/AC inverter 2434 and output through DC/DC converter 2432 to the load.

In general with respect to the descriptions herein, in one example an apparatus includes: a contact to an electrical supply for a circuit breaker to provide power to an electrical circuit when connected; and an integrated circuit (I/C) sensor mounted proximate the contact to generate current sense data for the electrical circuit when connected, including data to indicate real and reactive power draw of the electrical circuit.

In one example, the circuit breaker comprises a first circuit breaker, the electrical circuit comprises a first electrical circuit, the sensor comprises a first sensor, and the current sense data comprises first current sense data; and further comprising a second circuit breaker to couple to the contact for a second circuit breaker to provide power to a second electrical circuit when connected; and a second I/C sensor mounted proximate the contact to generate second current sense data for the second electrical circuit when connected, including data to indicate real and reactive power draw of the second electrical circuit. In one example, the apparatus further includes: a controller to receive the first current sense data and the second current sense data and compute real and reactive power current draw for the first and second electrical circuits, respectively. In one example, the controller is to compute the real and reactive power current draw for the second electrical circuit as a difference between the first current sense data and the second current sense data. In one example, the controller is to compute the real and reactive power current draw for the first electrical circuit based on the first current sense data, including to adjust computations to normalize for interference from the second electrical circuit as computed with the second current sense data. In one example, the controller is to compute real and reactive power current draw combined for the first and second electrical circuits. In one example, the controller is to send a command to a power converter coupled to the apparatus, to cause the power converter to adjust a ratio of real and reactive power to provide to the first electrical circuit. In one example, the contact comprises a first contact, the electrical supply comprises a first electrical supply, the circuit breaker comprises a first circuit breaker, the electrical circuit comprises a first electrical circuit, the sensor comprises a first sensor, and the current sense data comprises first current sense data; and further includes a second contact to a second electrical supply out of phase with respect to the first electrical supply, for a second circuit breaker to provide power to a second electrical circuit when connected; and a second circuit breaker to couple to the contact for a second circuit breaker to provide power to a second electrical circuit when connected; and a second I/C sensor mounted proximate the contact to generate second current sense data for the second electrical circuit when connected, including data to indicate real and reactive power draw of the second electrical circuit. In one example, the apparatus further includes: a controller to receive the first current sense data and the second current sense data and compute real and reactive power current draw for the first and second electrical circuits, respectively. In one example, the controller is to compute the real and reactive power current draw for the first electrical circuit based on the first current sense data, including to adjust computations to normalize for interference from the second electrical circuit as computed with the second current sense data.

In general with respect to the descriptions herein, in one example an apparatus includes: a first sensor to monitor a first current waveform of a connection to a point of common coupling (PCC) to connect to a power grid; a second sensor to monitor a second current waveform of a connection to a local system to couple to the PCC, the local system to include a local load and a local power converter; and a controller to compute a quadrant of operation of the second current waveform, compute a desired quadrant of operation of the second current waveform based on a quadrant of operation of the first current waveform, and send a command to cause the local power converter to adjust an operation of the second current waveform to the desired quadrant of operation.

In one example, the first sensor comprises a first internal power meter and the second sensor comprises a second internal power meter. In one example, the connection to the local system comprises circuit breakers. In one example, the controller is to send the command to cause the local power converter to adjust a ratio of real to reactive power generated by the local power converter to change the operation of the second current waveform to the desired quadrant. In one example, the controller is to send the command to cause the local power converter to adjust a ratio of real to reactive power generated from energy stored in a local energy storage device to change the operation of the second current waveform to the desired quadrant.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
a circuit breaker enclosure;
a conducting plate mounted in the circuit breaker enclosure, the conducting plate having multiple contacts to connect to a grid-tied electrical supply including a contact to receive a circuit breaker to provide power to an electrical circuit;

an insulator layer mounted over the conducting plate; and an integrated circuit (I/C) sensor mounted on the insulator layer proximate the contact to generate current sense data for the electrical circuit when the circuit breaker is connected, including data to indicate real and reactive power draw of the electrical circuit, the I/C sensor to be mounted above the conducting plate and below the circuit breaker.

2. The apparatus of claim 1, wherein the circuit breaker comprises a first circuit breaker, the electrical circuit comprises a first electrical circuit, the I/C sensor comprises a first I/C sensor, and the current sense data comprises first current sense data; and further comprising a second circuit breaker to couple to the contact to provide power to a second electrical circuit when connected; and a second I/C sensor mounted proximate the contact to generate second current sense data for the second electrical circuit when connected, including data to indicate real and reactive power draw of the second electrical circuit.

3. The apparatus of claim 2, further comprising:

a controller to receive the first current sense data and the second current sense data and compute real and reactive power current draw for the first and second electrical circuits, respectively.

4. The apparatus of claim 3, wherein the controller is to compute the real and reactive power current draw for the second electrical circuit as a difference between the first current sense data and the second current sense data.

5. The apparatus of claim 3, wherein the controller is to compute the real and reactive power current draw for the first electrical circuit based on the first current sense data, including to adjust computations to normalize for interference from the second electrical circuit as computed with the second current sense data.

6. The apparatus of claim 3, wherein the controller is to compute real and reactive power current draw combined for the first and second electrical circuits.

7. The apparatus of claim 3, wherein the controller is to send a command to a power converter coupled to the apparatus, to cause the power converter to adjust a ratio of real and reactive power to provide to the first electrical circuit.

8. The apparatus of claim 1, wherein the contact comprises a first contact, the electrical supply comprises a first electrical supply, the circuit breaker comprises a first circuit breaker, the electrical circuit comprises a first electrical circuit, the I/C sensor comprises a first I/C sensor, and the current sense data comprises first current sense data; and further comprising a second contact to a second electrical supply out of phase with respect to the first electrical supply, for a second circuit breaker to provide power to a second electrical circuit when connected;

a second circuit breaker to couple to the second contact to provide power to a second electrical circuit when connected; and a second I/C sensor mounted proximate the contact to generate second current sense data for the second electrical circuit when connected, including data to indicate real and reactive power draw of the second electrical circuit.

9. The apparatus of claim 8, further comprising:

a controller to receive the first current sense data and the second current sense data and compute real and reactive power current draw for the first and second electrical circuits, respectively.

10. The apparatus of claim 9, wherein the controller is to compute the real and reactive power current draw for the first electrical circuit based on the first current sense data, including to adjust computations to normalize for interference from the second electrical circuit as computed with the second current sense data.

11. The apparatus of claim 1, wherein the I/C sensor comprises a first I/C sensor and the current sense data comprises first current sense data, and further comprising:

a second I/C sensor mounted to the insulator layer proximate the contact to generate second current sense data for the electrical circuit when the circuit breaker is connected; and a controller to compute the real and reactive power current draw for the electrical circuit as a difference between the first current sense data and the second current sense data.

12. The apparatus of claim 11, wherein the contact comprises a first contact, the circuit breaker comprises a first circuit breaker, the electrical circuit comprises a first electrical circuit; and further comprising a second contact to a second electrical supply out of phase with respect to the electrical supply;

a second circuit breaker to connect to the second contact to provide power to a second electrical circuit when the second circuit breaker is connected;

a third I/C sensor mounted proximate the second contact to generate third current sense data for the second electrical circuit when connected, including data to indicate real and reactive power draw of the second electrical circuit; and a fourth I/C sensor mounted proximate the second contact to generate fourth current sense data for the second electrical circuit when the second circuit breaker is connected;

wherein the controller is to compute the real and reactive power current draw for the second electrical circuit as a difference between the third current sense data and the second current sense data.

13. The apparatus of claim 12, wherein the insulator layer comprises a first insulator layer and further comprising:

a second insulator layer between the conducting plate and the third I/C sensor and fourth I/C sensor, the third I/C sensor and the fourth I/C sensor mounted to the second insulator layer.

14. A method comprising:

providing an electrical connection for an electrical circuit in a circuit breaker enclosure through a conducting plate from a grid-tied electrical supply to a circuit breaker mounted to a contact of multiple contacts of the conducting plate; and generating current sense data for the electrical circuit with an integrated circuit (I/C) sensor mounted proximate the contact, above the conducting plate and below the circuit breaker, the I/C sensor mounted on an insulator layer between the conducting plate and the circuit breaker, including data to indicate real and reactive power draw of the electrical circuit.

15. The method of claim 14, the electrical circuit comprises a first electrical circuit, the circuit breaker comprises a first circuit breaker, the I/C sensor comprises a first I/C sensor, and the current sense data comprises first current sense data; and further comprising:
  providing a second electrical connection for a second electrical circuit through the conducting plate from the electrical supply to a second circuit breaker mounted to the contact; and
  generating second current sense data for the second electrical circuit with a second I/C sensor mounted proximate the contact, above the conducting plate and below the second circuit breaker, including data to indicate real and reactive power draw of the second electrical circuit.

16. The method of claim 15, further comprising receiving the first current sense data and the second current sense data at a controller; and computing real and reactive power current draw for the first and second electrical circuits, respectively, wherein computing the real and reactive power current draw comprises computing the real and reactive power current draw for the first electrical circuit based on the first current sense data, including adjusting computations to normalize for interference from the second electrical circuit as computed with the second current sense data.

17. The method of claim 15, further comprising receiving the first current sense data and the second current sense data at a controller; and computing real and reactive power current draw for the first and second electrical circuits, respectively, further comprising sending a command to a power converter to cause the power converter to adjust a ratio of real and reactive power to provide to the first electrical circuit.

18. The method of claim 14, wherein the contact comprises a first contact, the electrical supply comprises a first electrical supply, the conducting plate comprises a first conducting plate, the circuit breaker comprises a first circuit breaker, the electrical circuit comprises a first electrical circuit, the I/C sensor comprises a first I/C sensor, and the current sense data comprises first current sense data; and further comprising:
  providing a second electrical connection for a second electrical circuit through a second conducting plate from a second electrical supply to a second circuit breaker mounted to a second contact, the second electrical supply out of phase with respect to the first electrical supply; and
  generating second current sense data for the second electrical circuit with a second I/C sensor mounted proximate the second contact, above the second conducting plate and below the second circuit breaker, including data to indicate real and reactive power draw of the second electrical circuit.

19. The method of claim 18, further comprising:
receiving the first current sense data and the second current sense data at a controller; and
computing real and reactive power current draw for the first and second electrical circuits, respectively.

20. The method of claim 19, wherein computing the real and reactive power current draw comprises computing the real and reactive power current draw for the first electrical circuit based on the first current sense data, including adjusting computations to normalize for interference from the second electrical circuit as computed with the second current sense data.

\* \* \* \* \*